(12) United States Patent
Inoue et al.

(10) Patent No.: US 7,424,236 B2
(45) Date of Patent: Sep. 9, 2008

(54) CONTROLLING METHOD FOR IMAGE FORMING APPARATUS

(75) Inventors: Akira Inoue, Machida (JP); Takei Ishibashi, Sagamihara (JP); Michihiro Nakagawa, Sagamihara (JP); Hideki Endou, Fussa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 322 days.

(21) Appl. No.: 11/175,435

(22) Filed: Jul. 7, 2005

(65) Prior Publication Data

US 2006/0088331 A1    Apr. 27, 2006

(30) Foreign Application Priority Data

Oct. 25, 2004  (JP)  ............................. 2004-309999
Oct. 25, 2004  (JP)  ............................. 2004-310000
Oct. 25, 2004  (JP)  ............................. 2004-310001

(51) Int. Cl.
*G03G 15/00* (2006.01)

(52) U.S. Cl. .......................... 399/81; 399/82; 399/182; 399/183

(58) Field of Classification Search .................. 399/81, 399/82; 345/961, 966, 967; 361/681
See application file for complete search history.

(56) References Cited

U.S. PATENT DOCUMENTS 5,614,993 A * 3/1997 Smith et al. .................... 399/81
5,950,045 A * 9/1999 Nomura et al. ................ 399/81
6,453,132 B2 * 9/2002 Ishikura ........................ 399/81
6,567,627 B2 * 5/2003 Maeda et al. .................. 399/81
7,013,849 B2 * 3/2006 Rabhi ........................ 123/48 B
7,317,548 B2 * 1/2008 Ishizuka ..................... 358/1.15

FOREIGN PATENT DOCUMENTS

| JP | 11-147345 | 6/1999 |
| JP | 2002-354229 | 12/2002 |
| JP | 2003-005471 A | 1/2003 |
| JP | 2003-067153 | 3/2003 |
| JP | 2004-038880 | 2/2004 |
| JP | 2004-122791 | 4/2004 |
| JP | 2004-213305 | 7/2004 |

OTHER PUBLICATIONS

Official Action issued by the Japanese Patent Office in priority-application No. JP 2004-310000 on Dec. 19, 2006, and English translation thereof.
Notification of Reason for Refusal issued in corresponding Japanese Patent Application No. 2004-310000, mailed Jun. 6, 2006, and translation thereof.

* cited by examiner

*Primary Examiner*—Hoan H Tran
(74) *Attorney, Agent, or Firm*—Buchanan Ingersoll & Rooney PC

(57) ABSTRACT

A controlling method for controlling an image forming apparatus has a step of displaying a printing paper illustration representing printing paper on an operating screen and a step of displaying at least one icon related to a process function of the image forming apparatus. The controlling method further has a step of selecting a process function that corresponds to the specified icon and a step of determining the location to which the selected process function is applied upon receiving an instruction for a position on the printing paper illustration.

17 Claims, 30 Drawing Sheets

FIG. 7

| PROCESS FUNCTION | POSITION SPECIFIABLE AREA | | |
|---|---|---|---|
| PUNCH TWO PLACES | RIGHT EDGE CENTER | LEFT EDGE CENTER | TOP EDGE CENTER |
| PUNCH THREE PLACES | RIGHT EDGE CENTER | LEFT EDGE CENTER | TOP EDGE CENTER |
| PUNCH FOUR PLACES | RIGHT EDGE CENTER | LEFT EDGE CENTER | TOP EDGE CENTER |
| STAPLE ONE PLACE | RIGHT TOP CORNER | LEFT TOP CORNER | — |
| STAPLE TWO PLACES | RIGHT EDGE CENTER | LEFT EDGE CENTER | TOP EDGE CENTER |
| INSERTION PAPER | N-TH PAGE SIDE | (N + 1)ST PAGE SIDE | BETWEEN N-TH PAGE AND (N+1)ST PAGE |
| WATERMARK | WITHIN PRINTING AREA | — | — |

FIG.12

| | STAPLE ONE PLACE:RIGHT TOP CORNER | STAPLE ONE PLACE:LEFT TOP CORNER | STAPLE TWO PLACES:TOP EDGE CENTER | STAPLE TWO PLACES:RIGHT EDGE CENTER | STAPLE TWO PLACES:LEFT EDGE CENTER | Z-FOLD | CENTER FOLD | CENTER STAPLING | PUNCH:RIGHT EDGE CENTER | PUNCH:LEFT EDGE CENTER | PUNCH:TOP EDGE CENTER |
|---|---|---|---|---|---|---|---|---|---|---|---|
| ○: SIMULTANEOUSLY SELECTABLE  ×: NOT SIMULTANEOUSLY SELECTABLE  □: EXCLUSIVE SETTING ALLOWED | | | | | | | | | | | |
| STAPLE ONE PLACE:RIGHT TOP CORNER | | □ | □ | □ | □ | ○ | □ | □ | × | ○ | ○ |
| STAPLE ONE PLACE:LEFT TOP CORNER | □ | | □ | □ | □ | ○ | □ | □ | ○ | × | ○ |
| STAPLE TWO PLACES:TOP EDGE CENTER | □ | □ | | □ | □ | ○ | □ | □ | × | × | ○ |
| STAPLE TWO PLACES:RIGHT EDGE CENTER | □ | □ | □ | | □ | ○ | □ | □ | ○ | × | × |
| STAPLE TWO PLACES:LEFT EDGE CENTER | □ | □ | □ | □ | | ○ | □ | □ | × | ○ | × |
| Z-FOLD | ○ | ○ | ○ | ○ | ○ | | □ | □ | ○ | ○ | ○ |
| CENTER FOLD | □ | □ | □ | □ | □ | □ | | □ | □ | □ | □ |
| CENTER STAPLING | □ | □ | □ | □ | □ | □ | □ | | □ | □ | □ |
| PUNCH:RIGHT EDGE CENTER | × | ○ | × | ○ | × | ○ | □ | □ | | □ | □ |
| PUNCH:LEFT EDGE CENTER | ○ | × | × | × | ○ | ○ | □ | □ | □ | | □ |
| PUNCH:TOP EDGE CENTER | ○ | ○ | ○ | × | × | ○ | □ | □ | □ | □ | |

CONTROLLING METHOD FOR IMAGE FORMING APPARATUS

This application is based on Japanese Patent Application Nos. 2004-309999, 2004-310000 and 2004-310001 filed on Oct. 25, 2004, the contents of which are hereby incorporated by reference.

BACKGROUND OF THE INVENTION

1. Field of the Invention

The present invention relates to a controlling method for an image forming apparatus, in particular, a controlling method by using a printer driver.

2. Description of Related Art

Image forming apparatuses such as printers, copying machines, compound machines and MFPs (Multi-Function Peripherals) have printing, post-processing and various other processing capabilities. A user can select process functions that apply to each printing job by using a control program called printer driver.

A window called "dialog box" is displayed on an operating screen in case of a general printer driver's GUI (graphical user interface). The window has an area where items called "tabs" are displayed. The printer driver disclosed by JP H11-147345A uses a pull-down method in which a plurality of process functions are displayed from the top to the bottom of the operating screen to be set up as the user select one of the tabs.

However, in order to select a process function using the pull-down method, the user must select a tab that corresponds to a desired process function's setup item. Therefore, it may be difficult for a novice user who is not familiar with the relation between the setup item for each process function and a corresponding tab to know which tab to be selected in order to reach a proper setup item for a desired process function, and may make take an extra time to select a process function.

Also, the process functions may include a process function for specifying a desired location of application on a sheet of printing paper. Take for example a case of a hole punching process, which is one of the process functions available, the center on the left edge, the center on the right edge, or the center at the top edge can be determined as a location on the sheet of printing paper to which the punching process can be applied. The location on the sheet of printing paper can be determined by specifying either one of the center on the left edge, the center on the right edge, or the center at the top edge by using a radio button. A radio button is a small circular button appearing in a window, which the user can express his/her selection by filling it with a color or leaving it blank.

However, it is difficult to recognize visually a location on the sheet where a particular process function is to be applied. Therefore, the user may initiate a process by specifying a wrong location by mistake.

JP 2004-038880A discloses a printer driver using icons instead of tabs and radio buttons. However, the icons are used as simple buttons on the printer driver disclosed by JP 2004-038880A. In other words, the printer driver shown in JP 2004-038880A provides nothing but a method of replacing a tab with an icon on the operating screen. Therefore, it still takes time for setting up the process function and is not solving the abovementioned problem of difficulty in specifying a location on the sheet of printing paper by visually recognizing it.

OBJECTS AND SUMMARY

An object of the present invention is to provide a controlling method for an image forming apparatus in order to reduce a workload required for selecting and setting various desired process functions.

Another object of the invention is to provide an image forming apparatus capable of providing easily operating means for visual recognition in addition to reducing the workload required for selecting and setting various desired process functions.

Another object of the invention is to provide an image forming apparatus that allows the user to set up an insertion location of insertion paper by visually confirming the insertion location when an insertion paper inserting function is selected.

Still another object of the invention is to provide an image forming apparatus that allows the user to set up the printing paper by visually confirming the size and/or orientation of the printing paper.

According to an embodiment of the invention, a controlling method for the image forming apparatus has a step of displaying a printing paper illustration representing printing paper on an operating screen, and a step of displaying at least one icon related to a process function of the image forming apparatus. The controlling method further has a step of selecting a process function corresponding to an icon specified out of the displayed icon, and a step of determining a location to which the selected process function is applied upon receiving an instruction for a position on the printing paper illustration.

According to another embodiment of the invention, a controlling method for the image forming apparatus has a step of displaying a printing paper illustration representing a consecutive pages of printing paper on an operating screen; and a step of determining an insertion location of insertion paper by receiving an instruction for a position on the printing paper illustration.

According to still another embodiment of the invention, a controlling method for the image forming apparatus has a step of displaying a printing paper illustration representing printing paper on an operating screen, a step of reshaping the printing paper illustration upon receiving an instruction for a reshaping position on the operating screen, and a step of determining the printing paper's size and/or orientation in accordance with the reshaped printing paper illustration.

BRIEF DESCRIPTION OF THE DRAWINGS

FIG. 7 shows an example of a first table for setting up position specifiable areas;

FIG. 12 is an example of a second table showing a capability of selecting a plurality of process functions simultaneously;

FIG. 13 is an example of the operating screen when no location has been designated for any process function to be applied to;

FIG. 14 is an example of the operating screen when a location has been designated for a process function to be applied to;

DETAILED DESCRIPTION OF PREFERRED EMBODIMENTS

The preferred embodiments of the present invention will be described below with reference to the accompanying drawings.

First Embodiment

Figure 1:
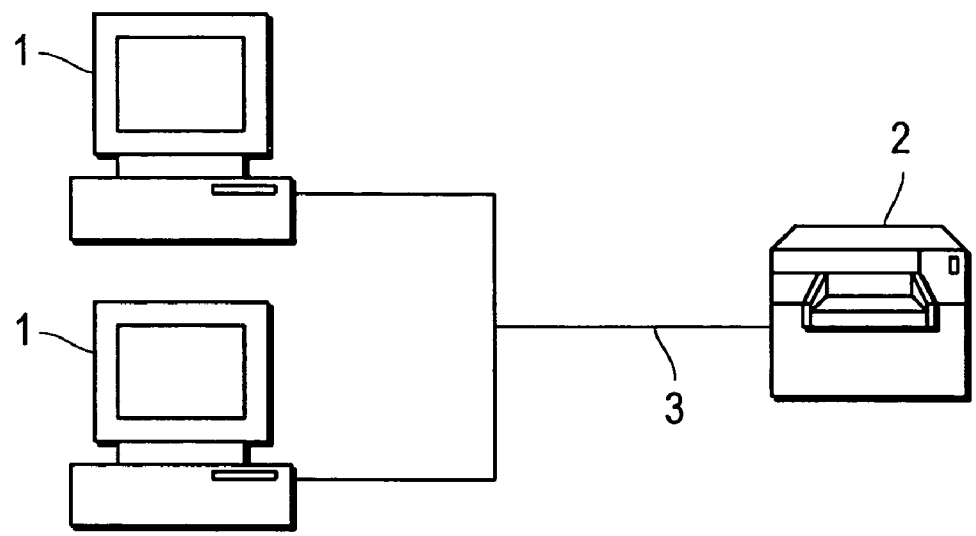
FIG. 1 is a block diagram showing the entire constitution of an image processing system according to a first embodiment of the present invention.

FIG. 1 is a block diagram showing the entire constitution of an image processing system according to a first embodiment of the present invention.

The image processing system is equipped with a computer terminal (hereinafter called "PC") 1 as a printing job transmission apparatus and a printer 2 as an image forming apparatus. The PC 1 and the printer 2 are communicably connected with each other via a network 3. The network 3 can be a LAN connecting computers and network equipment according to standards such as Ethernet®, Token Ring, and FDDI, or a WAN that consists of several LANs connected by a dedicated line.

The types and the number of equipment to be connected to the network 3 are not limited to those shown in FIG. 1. Also, the PC 1 and the printer 2 can be connected directly (local connection) without recourse to network 3.

In the present embodiment, a printer driver is installed in the PC 1 as a control program for controlling the printer 2. More specifically, the printer driver is a control program for converting document files into print data described in a language that can be translated by the printer 2. The printer driver is also used for selecting one or more process functions of the printer 2 and determining the locations on the printing paper for those process functions to be applied. The process functions of the printer 2 may include printing functions and post-process functions executed after printing. One or more process functions can be selected for each printing job. In this embodiment, one or more process functions are selected using this printer driver as described. This embodiment also indicates a process of determining the location on the printing paper in which the selected process function is to be applied.

Figure 2:
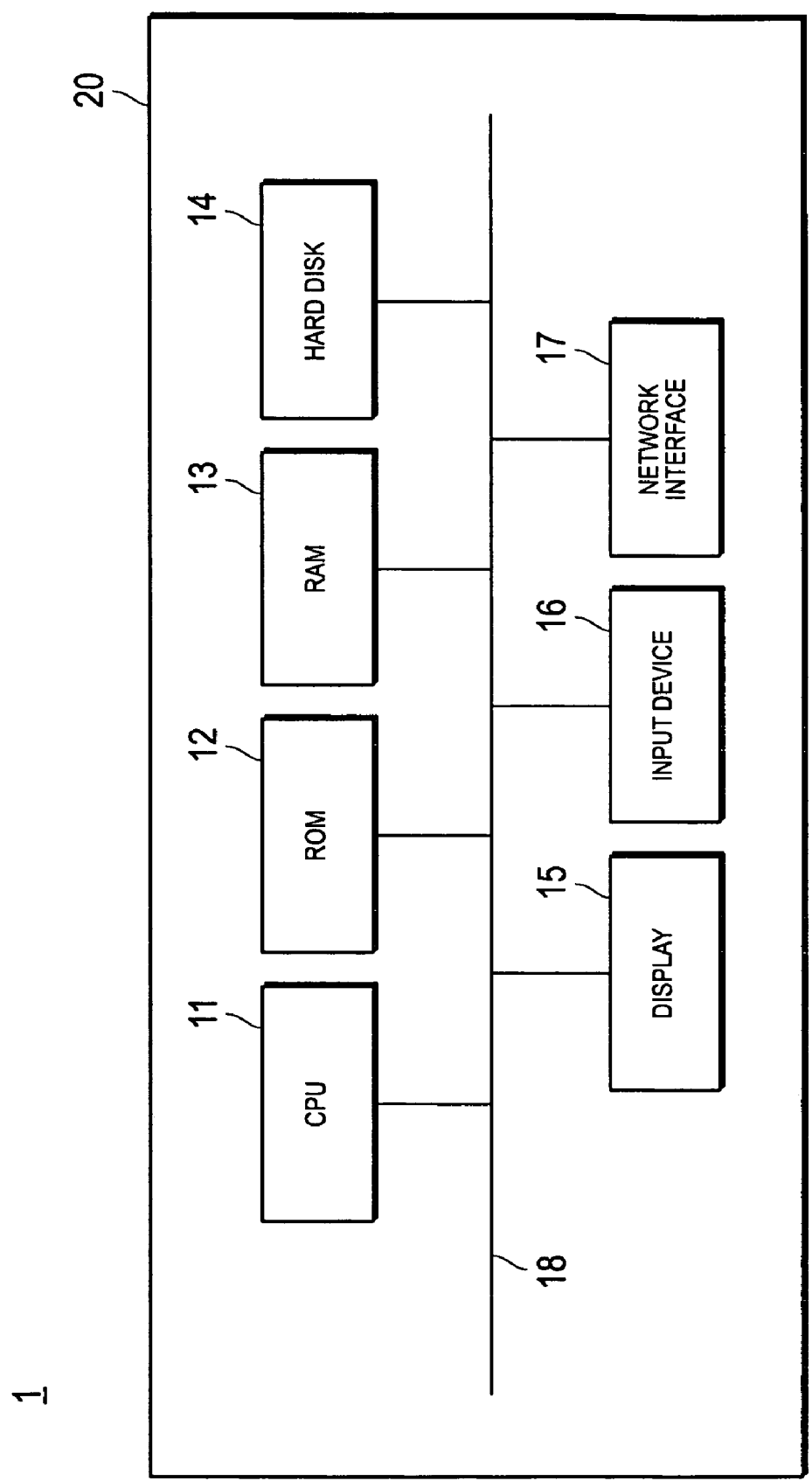
FIG. 2 is a block diagram showing the constitution of the computer terminal shown in FIG. 1.

FIG. 2 is a block diagram showing the constitution of the PC 1 shown in FIG. 1. The PC1 is equipped with a CPU (central processing unit) 11, a ROM (read only memory) 12, a RAM (random access memory) 13, a hard disk 14, a display 15, an input device 16, and a network interface 17. These parts 11 through 17 are interconnected for exchanging signals via a bus 18.

The CPU 11 controls the parts 12 through 17 and executes various arithmetic processes in accordance with program. The ROM 12 stores various programs and data. The RAM 13 stores programs and data temporarily as a working area. The hard disk 14 stores various programs including an operating system and data. The hard disk 14 holds various kinds of application software such as software for generating document files and the abovementioned printer driver installed on it.

The display 15 displays various kinds of information. The display 15 displays a operating screen for user to select one or more process functions for each printing job to be executed by the printer 2.

The input device 16 may be equipped with a pointing device and a keyboard for making various kinds of inputs. Since the drag and drop operating process is used in the embodiment as described later, the pointing device plays an important role. The "drag and drop" process means a process of pressing a button of the input device 16 while the cursor (mouse cursor, etc.) is pointing at a symbol such as an icon, moving the cursor while keep pressing the button (drag), and relieving the button at a separate location (drop). A mouse is used as the pointing device in this embodiment. However, other pointing devices such as a track ball, a track pad, a tablet and a stylus pen can be used as well different from this embodiment.

The network interface 17 is an interface to connect with the network 3 for communicating with other devices on the network using standards such as Ethernet®, Token Ring, and FDDI.

Figure 3:
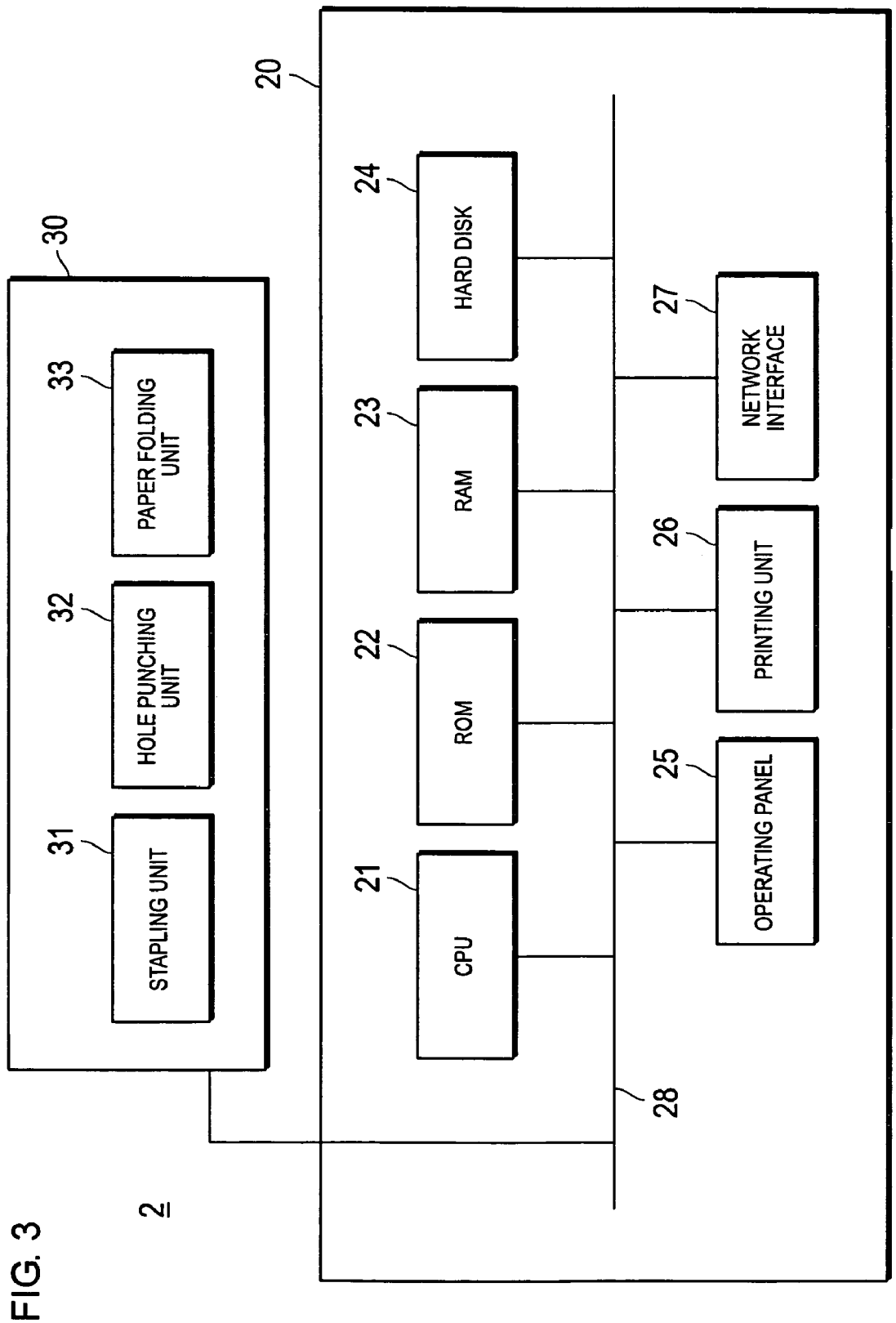
FIG. 3 is a block diagram showing the constitution of the printer shown in FIG. 1.

FIG. 3 is a block diagram showing the constitution of printer 2 shown in FIG. 1. The printer 2 includes a printer main unit 20 and a post-processing device (finisher) 30.

The printer main unit 20 has a CPU 21, a ROM 22, a RAM 23, a hard disk 24, an operating panel 25, a printing unit 26, and a network interface 27, all of which are interconnected with each other via a bus 28 for exchanging signals. The post-processing device (finisher) 30 includes a stapling unit 31, a hole punching unit 32 and a paper folding unit 33. The descriptions of those parts of the printer 2 having the same functions as those of the corresponding parts of the PC 1 will be omitted here to avoid being duplicative.

The operating panel 25 may be equipped with a touch panel, a ten-key pad, a start button, a stop button and others to be used for displaying various data and entering various instructions. The printing unit 26 prints various data on a recording medium such as printing paper by using a known image forming process such as an electronic photography type process.

The stapling unit 31 of the post-processing device 30 staples the printing paper. The hole punching unit 32 punches holes in the printing paper. The paper folding unit 33 folds the printing paper.

The PC 1 and the printer 2 can each contain constitutional elements other than those described above, or may lack a portion of the abovementioned elements.

Next, we will describe the operations of the image processing system according to this embodiment constituted in such a way described above.

Figure 4:
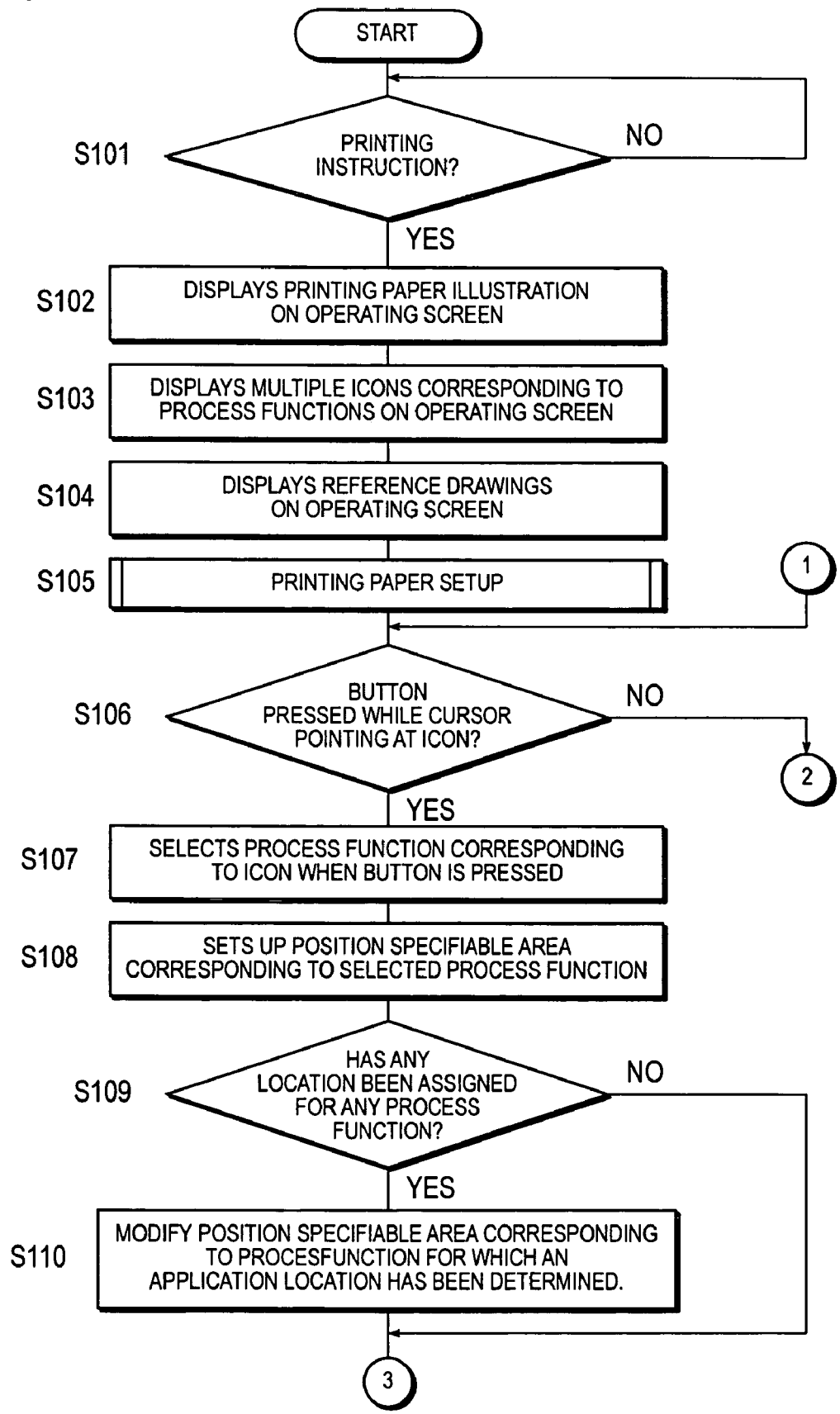
FIG. 4 is a flowchart showing a processing procedure by the computer terminal for setting up process functions of the printer shown in FIG. 1.
Figure 5:
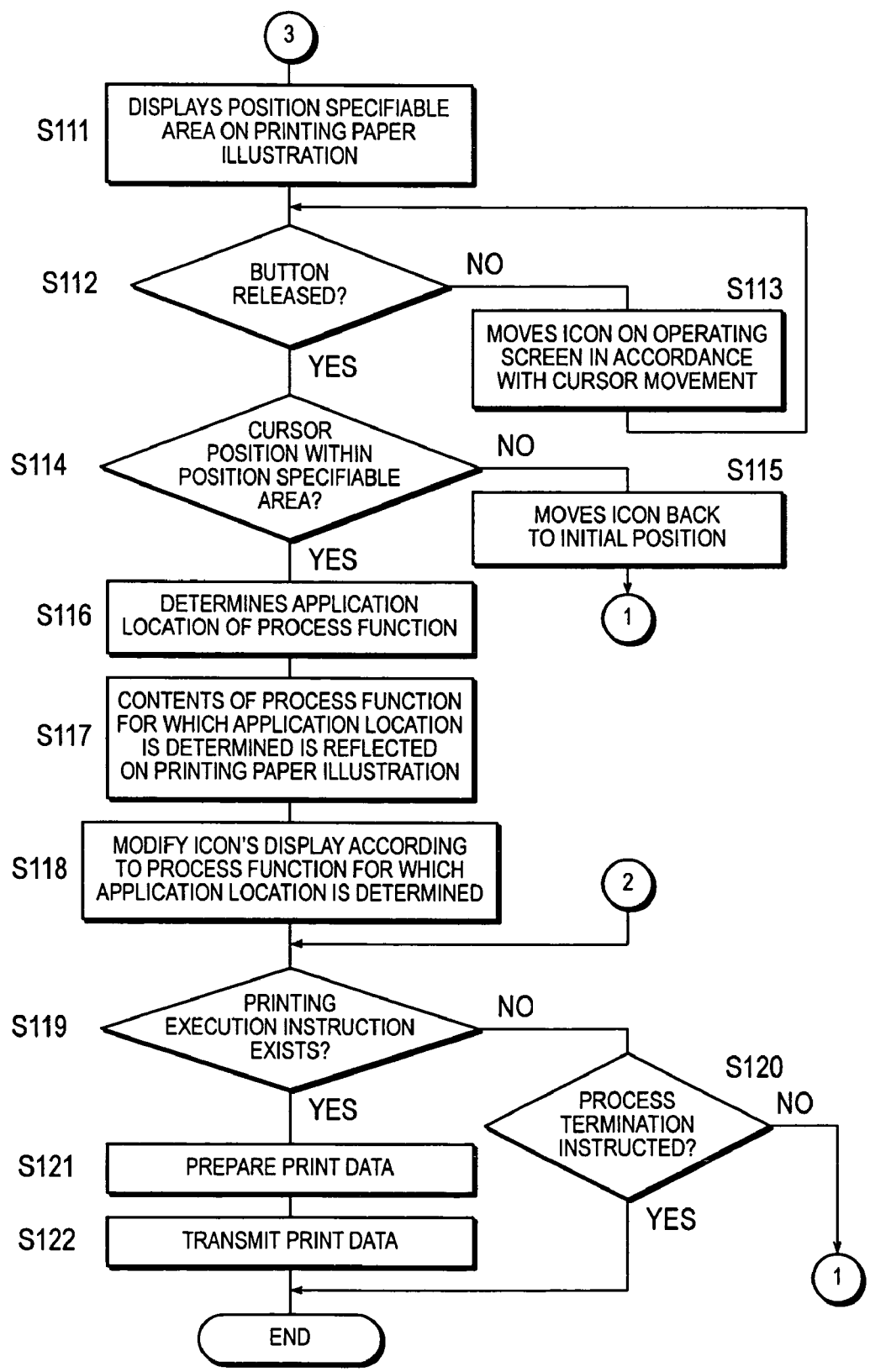
FIG. 5 is a flowchart that follows FIG. 4.

FIG. 4 and FIG. 5 are flowcharts for describing the process sequence of the PC 1 according to this embodiment, more specifically, flowcharts showing the method of controlling the printer 2. The algorithm shown in the flowcharts of FIG. 4 and FIG. 5 is stored as a program in a storage unit such as the hard disk 14 of the PC 1 and executed by the CPU 11.

The PC 1 will stand by until it receives an instruction for printing based on the user's operation (step S101: No). The printing is instructed to a document file prepared using the application software. When the instruction is received (step S101: Yes), an illustration representing the printing paper (hereinafter called "printing paper illustration"), in other words, a diagram that corresponds with the printing paper, will be displayed on the operating screen of the display 15 (step S102), and also a plurality of icons that are related to various process functions of the printer 2 will be displayed (step S103). The screen will also displays a plurality of reference drawings corresponding to a plurality of printing paper sizes and/or orientations (step S104). These reference drawings are used in the printing paper setup process to be described later.

Figure 6:
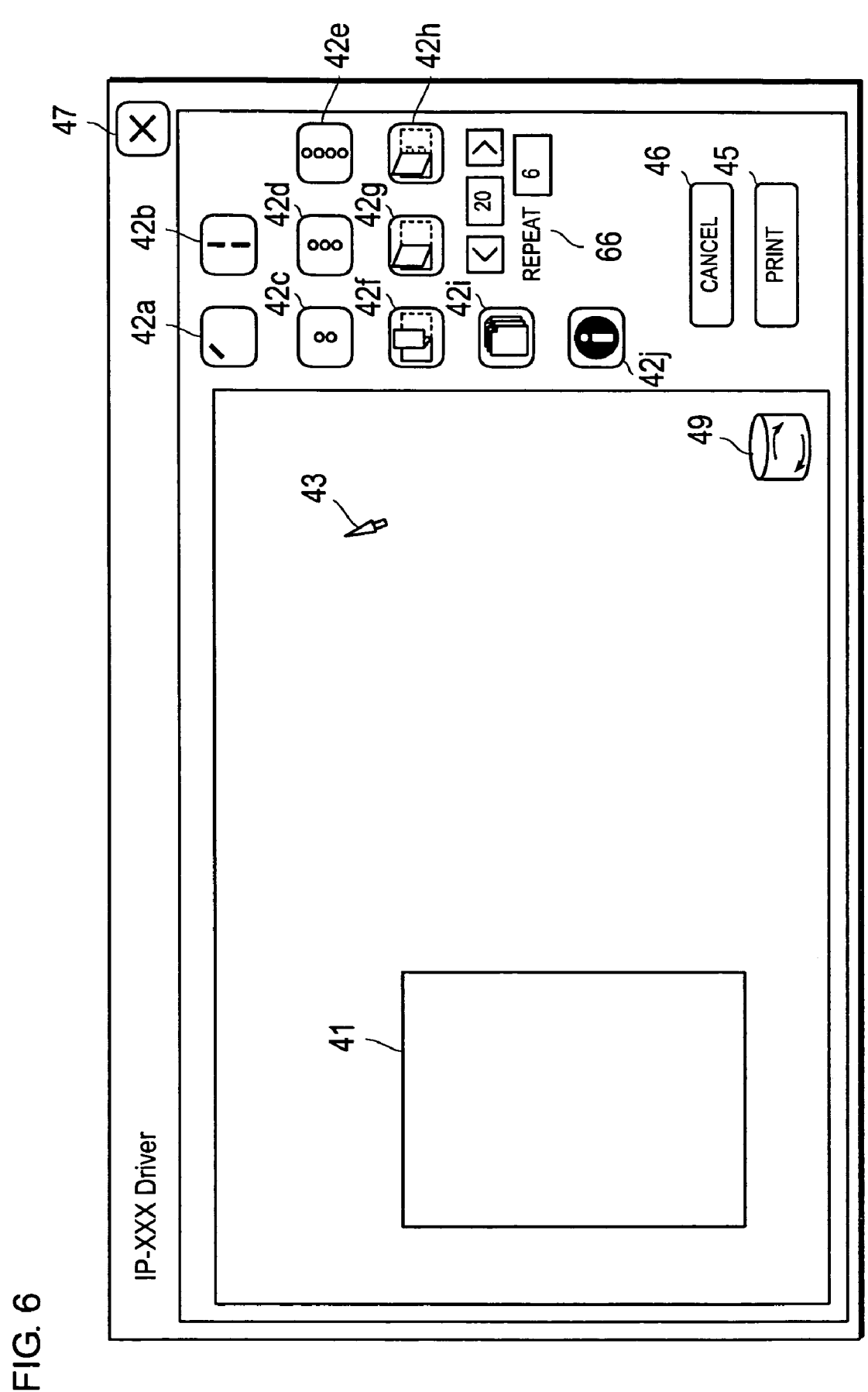
FIG. 6 shows an example of the operating screen of the computer terminal shown in FIG. 2.

FIG. 6 shows an example of the operating screen. As shown in FIG. 6, the operating screen displays the printing paper illustration as well as a plurality of icons 42a through 42j (hereinafter called "icons 42"). Each icon 42 is related to a process function of the printer 2. The operating screen shown in FIG. 6 does not show the parts related to the printing paper setup process, in particular, reference drawings, for the sake of brevity and avoiding confusions. The printing paper setup process will be described later.

The icons 42a and 42b are related to the stapling process functions using one stapling needle and two stapling needles respectively. The icons 42c, 42d, and 42e correspond to the hole punching functions of punching two, three, and four holes in the printing paper. The icons 42f and 42g correspond to Z-folding and center folding respectively of the paper folding process functions. The Z-folding is a paper folding process function in which the printing paper is folded in one direction and then folded in the opposite folding. The center folding is a paper folding process function in which the printing paper is folded in which the paper is folded in the middle.

The icon 42h corresponds to a process function called the center stapling. The center stapling corresponds to a process function in which the paper is center folded and then stapled in the area of the folding. The icon 42i corresponds to the paper insertion function. The paper insertion function represents a process function in which an insertion paper with different feature such as size, orientation, and/or color is inserted between the specified consecutive pages. The icon 42j represents a watermark printing process function. The watermark printing process function is a printing process function for printing additional images such as "Externally Confidential," "Confidential," and "Draft," in addition to a specified image. It is also possible to constitute the program in such a way that specifying the icon 42j causes icons that correspond to watermark printing process functions for additional images such as "Externally Confidential," "Confidential," and "Draft" to be displayed on the screen.

The cursor 43 is an indicator in a form such as an arrow to be displayed on the operating screen of the computer. The cursor 43 is preferably a mouse cursor, which is also called a mouse pointer. The cursor 43 moves over the operating screen freely as the user operates the input device 16. For example, if the input device 16 is a mouse, moving the mouse forward, backward, left and right causes the cursor 43 to move over the operating screen.

Depending on the process function being selected, it is sometimes necessary to designate a page. Consequently, a page designator 66 is displayed on the operating screen for specifying a page. For example, the page designator 66 is used for designating the paper insertion location when the paper insertion function is selected.

Moreover, various printing paper setup processes are executed according to the flowchart shown in FIG. 4 (step S105). The printing paper setup process is a process of setting up the size and/or orientation of the printing paper. The details of the printing paper setup process will be described later.

Next, a judgment is made as to whether the button of the input device 16 is pressed or not while the cursor 43 is pointing at the icons 42 (step S106). If it is judged that the button of the input device 16 is not pressed while the cursor 43 is pointing at the icons 42 (step S106: No), the current processing proceeds to the step S119 skipping the steps S107 through S118. On the other hand, if it is judged that the button of the input device 16 is pressed while the cursor 43 is pointing at the icons 42 (step S106: Yes), the process function that corresponds to the icons 42 that the cursor 43 is pointing at will be selected when the button is pressed (step S107). For example, if the button of the input device 16 is pressed while the cursor 43 is pointing at the icon 42b in the abovementioned FIG. 6, the process function that corresponds to the icon 42b, i.e., the process function for stapling the printing paper using two staple needles will be selected. Processing of these steps S106 and S107 corresponds to a step of selecting a designated process function upon receiving a designation of an icon (e.g., icon 42b) among a plurality of icons 42. In other words, the processing of these steps S106 and S107 indicates a step of selecting a process function corresponding to an icon specified out of the displayed icon.

When a process function is selected, one or more areas where the position can be instructed or specified (position specifiable area) on the printing paper illustration 41 are set up depending on the contents of the selected process function (step S108). The position specifiable area is set up with reference to the first table stored in advance in the ROM 12 or the hard disk 14.

FIG. 7 shows an example of the first table for setting up position specifiable areas. The first table specifies the correlations between the process functions and the position specifiable areas. In a practical case, the position specifiable areas can be specified by the coordinates. The CPU 11 can set up the position specifiable area for a selected process function by referencing the first table.

Figure 8:
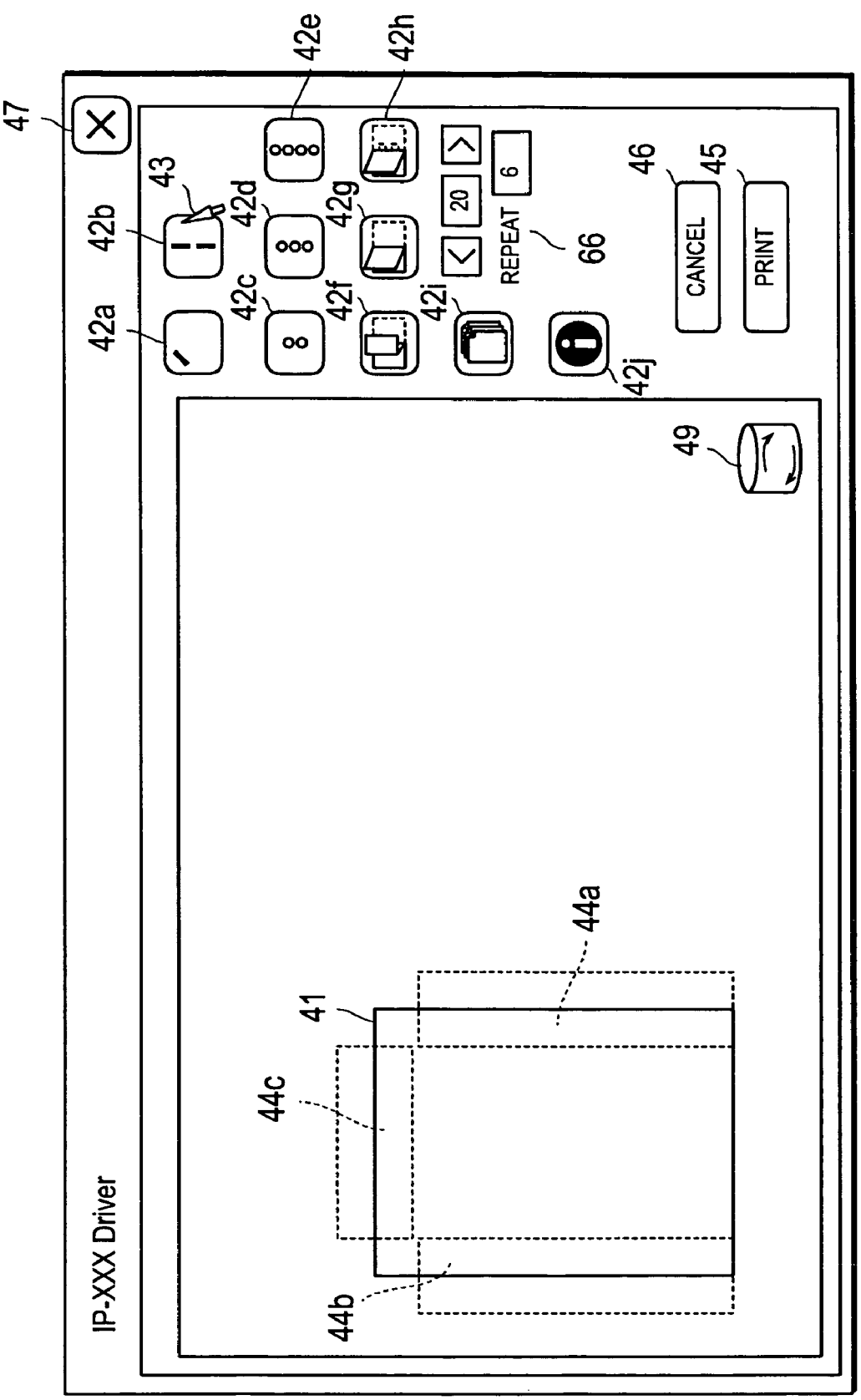
FIG. 8 shows an example of the operating screen in which a process function for stapling the printing paper with two stapling needles.

FIG. 8 shows an example of the operating screen wherein the position specifiable areas 44a, 44b, and 44c are being set up. FIG. 8 shows an example of the operating screen for a process function for stapling with two stapling needles. The CPU 11 specifies areas 44a, 44b, and 44c at the center of the right edge, the center of the left edge, and the center of the top edge respectively of the printing paper illustration 41 by referencing the first table shown in FIG. 7.

Figure 9:
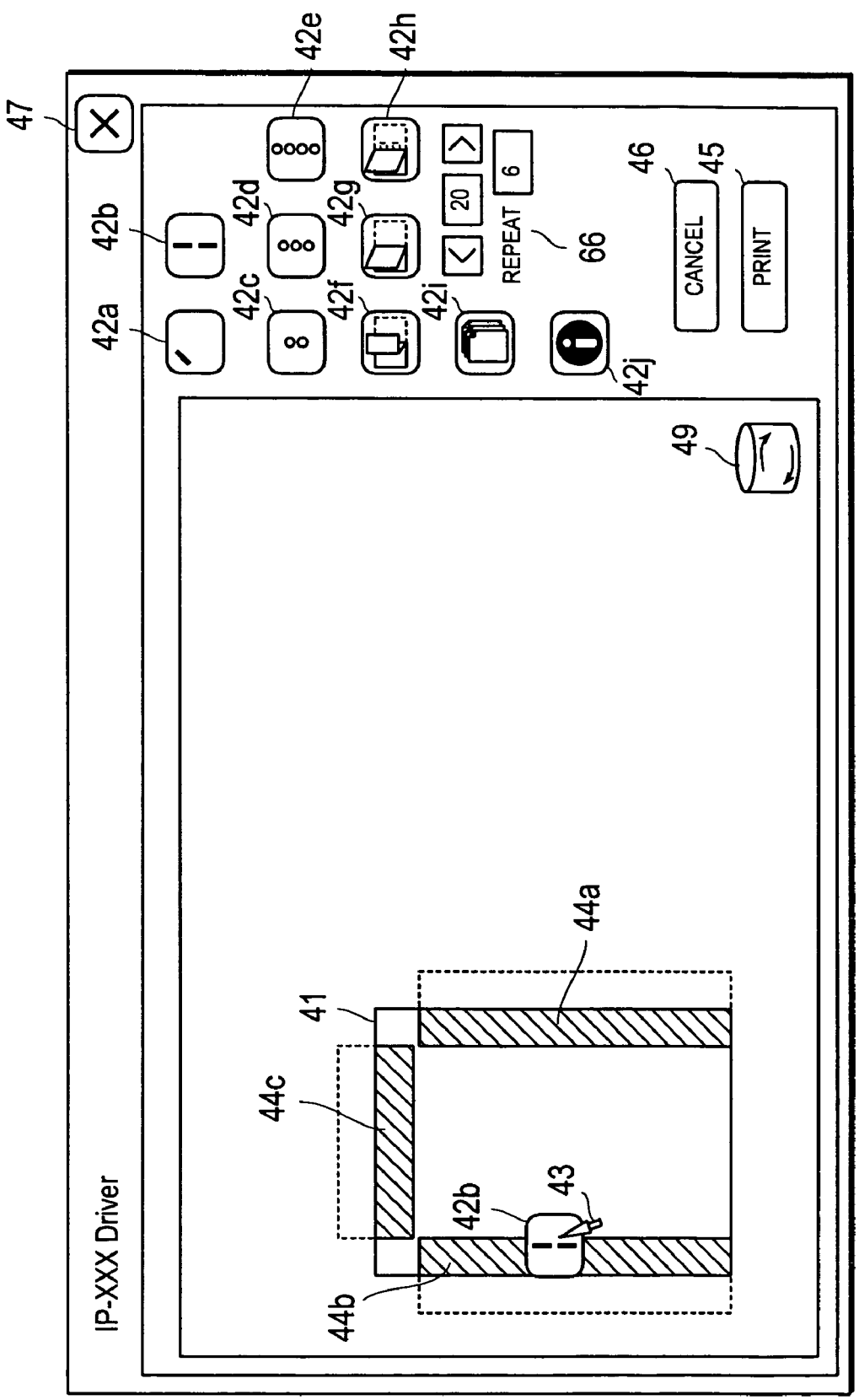
FIG. 9 shows an example of the operating screen displaying the position specifiable areas.

Next, the CPU 11 makes a judgment as to whether there is any location that has been assigned to a certain prior process function (step S109). In the first stage, since none of those locations has been taken by any of the prior process functions (step S109: No), the current processing advances to the process of the step S111 of FIG. 5 skipping the process of S110. In the step S111, the position specifiable areas 44a through 44c are shown on the printing paper illustration 41. For example, as shown in FIG. 9, the position specifiable areas 44a through 44c are shown on the printing paper illustration 41 by means of changing the colors and shadings of certain areas of the printing paper illustration 41. In other words, the processing of step S111 indicates a step of displaying the area where the position can be instructed on the printing paper illustration 41. As a result, the user can work by visually confirming the position specifiable areas 44a through 44c.

Next, a judgment is made as to whether the button of the input device 16 is released or not (step S112). If the button has not been released (step S112: No), the icon 42 moves over the operating screen in coordination with the movement of the cursor 43 (step S113). In other words, the process of the step S113 corresponds to a process of dragging the icon 42 by the cursor 43. As the button of the input device 16 is released (step S112: Yes), a judgment is made as to whether the position of the cursor 43 when the button is released is within the position specifiable areas 44a through 44c (step S114). The process of releasing the button while the cursor 43 is within the specified area corresponds to the cursor process of dropping an object in the specified area.

If the position of the cursor 43 when the button is released is not within the position specifiable areas 44a through 44c (step S114: No), it is judged that the user abandoned the attempt of specifying a location. Therefore, the icon 42 is returned to the initial position (step S115), and the current processing proceeds to the step S106 without setting up any process function. On the other hand, if the position of the cursor 43 when the button is released is within the position specifiable areas 44a through 44c (step S114: Yes), the location on the printing paper to which the selected process function is applied is determined by receiving an instruction for the position on the printing paper illustration 41 by means of the cursor 43 (step S116).

The processes of the steps S112 through S116 correspond to the process of determining a location to which the process function selected in the step S107 is applied upon receiving an instruction for a position on the printing paper illustration 41. The position on the printing paper illustration 41 is instructed by moving the icon 42 to one of the position specifiable areas 44a through 44c on the operating screen. More specifically, the position instruction using the icon 42 is accomplished by pressing the button of the input device 16 while the cursor 43 is pointing at the icon 42. The instruction of the position on the printing paper illustration 41 is accomplished by moving the cursor 43 while the button of the input device 16 is being pressed and releasing the button of the input device 16 as the cursor 43 is pointing at one of the position specifiable areas 44a through 44c. In other words, the position on the printing paper illustration 41 is instructed by dragging the specefied icon and dropping the specified icon within one of the position specifiable areas 44a through 44c.

Figure 10:
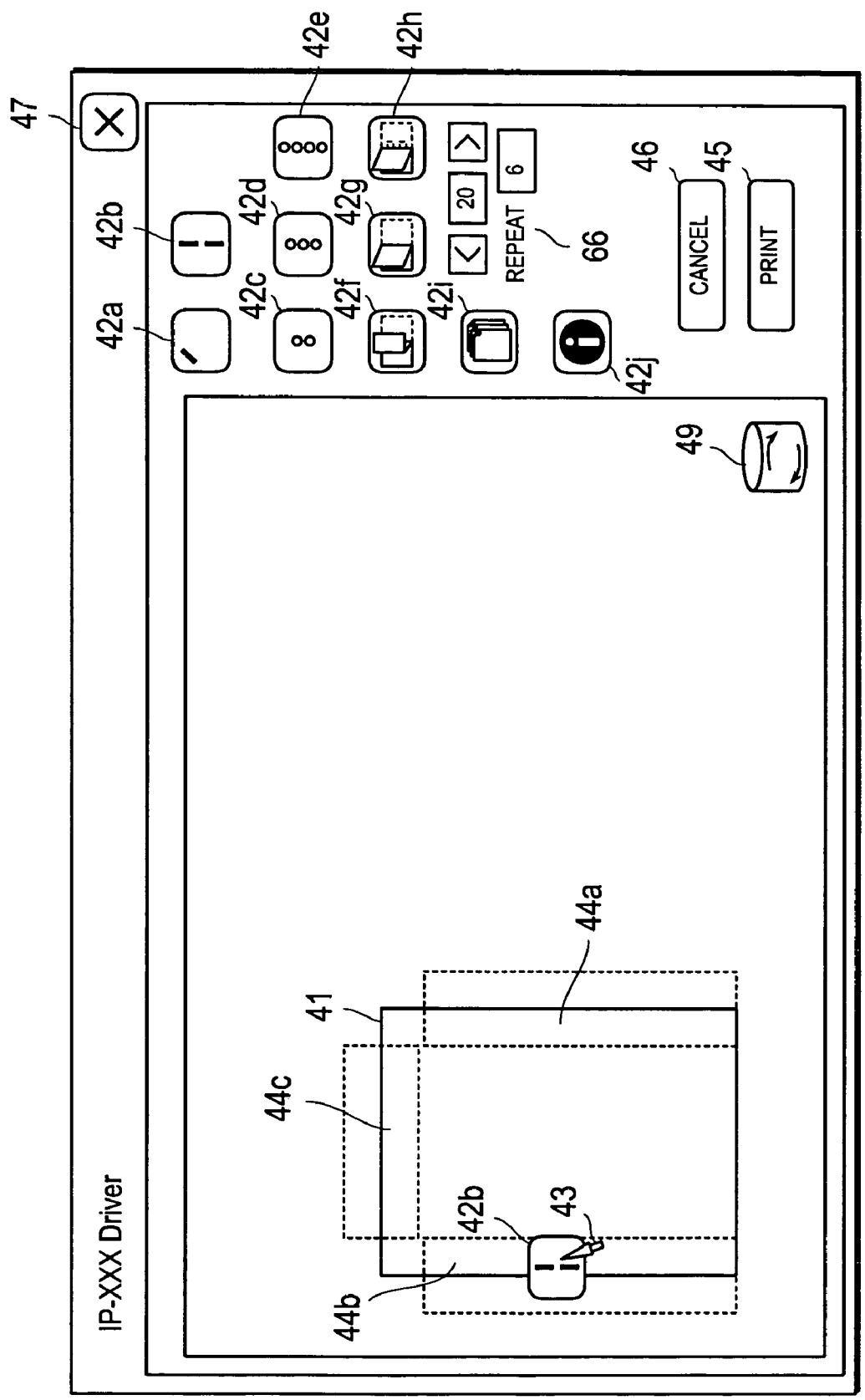
FIG. 10 shows an example of the operating screen wherein a cursor is pointing at the position specifiable area on a printing paper illustration.

FIG. 10 shows a status where the cursor 43 is pointing at the area 44b located in the center of the left edge of the printing paper illustration 41. As the button of the input device 16 is released while it is in the condition shown in FIG. 10, the location where the process function that corresponds to the icon 42b (i.e., the process function of stapling using two staple needles) is applied, is determined relative to the printing paper. In the case shown in FIG. 10, the execution of stapling in the center of the left edge is being determined.

Next, the contents of the process function, for which the location of application is determined, are reflected on the printing paper illustration 41 (step S117). In other words, the steps S117 correspond to the process of modifying the display of the printing paper illustration 41, in accordance with the contents of the prior prosess function for which the application location has been determined and the application location threof. It is preferable that a function reflecting icon is displayed for indicating the contents of the process function, for which the application location has been determined, on the printing paper illustration 41.

Figure 11:
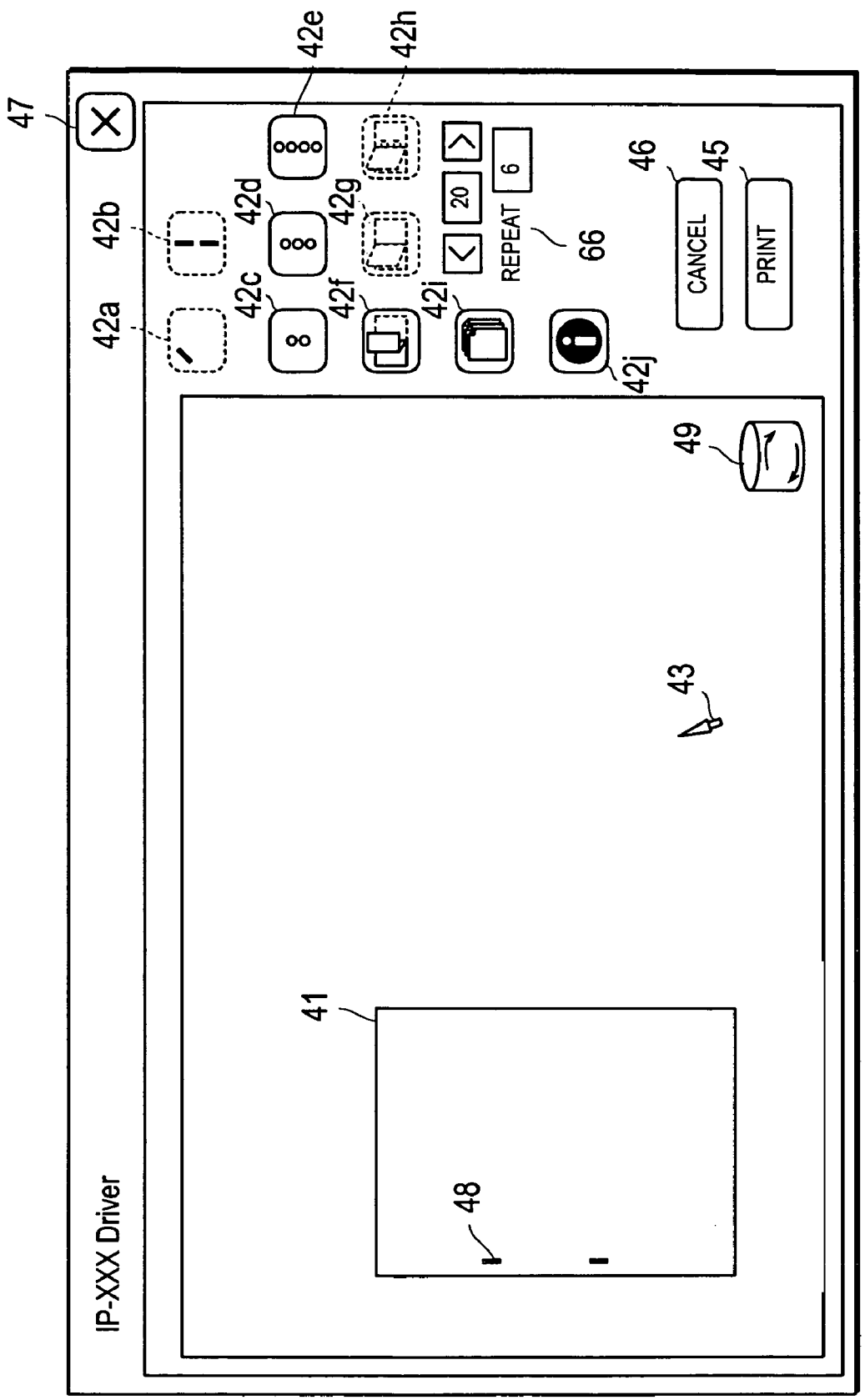
FIG. 11 is an example of the operating screen wherein a process function is indicated on the printing paper illustration.

FIG. 11 shows a status, in which the contents of the process function being reflected on the printing paper illustration 41. FIG. 11 shows the staples applied in the center of the left edge of the printing paper illustration 41. More preferably, a function reflecting icon 48 that corresponds to the stapling function is displayed on the printing paper illustration 41. As a result, the fact that the stapling function is being executed at the center of the left edge of the actual printing paper is displayed visually.

More preferably, the function reflecting icon 48 can be used for canceling the application of a process function for which the location of application has been determined. For example, the user can cancel a process function for which the location has been assigned by specifying the function reflecting icon 48 that corresponds to the particular process function that the user wishes to cancel, dragging the function reflecting icon 48 to a cancellation area 49, and then dropping the function reflecting icon 48 in the cancellation area 49. More specifically, the user can cancel the process function by pressing the button of the input device 16 while the cursor 43 is pointing at the function reflection icon 48, moving the cursor 43 while keeping the button pressed (dragging), and then releasing it in the cancellation area 49 (dropping). CPU 11 can execute the selection of the process function that corresponds to the specified function reflection icon 48, and the cancellation of the selected process function when the cancellation is instructed.

Next, the display of the icon 42 is modified in accordance with the contents of the process function, for which the location of application is determined (step S118). Preferably, the display of the icons 42 which can no longer be specified is modified in accordance with the contents of the process function for which the location of application has been determined. This process corresponds to a case where certain process functions are no longer selectable in accordance with the contents of the process function for which the location of application has been determined. In other words, the step of displaying the icons 42 includes the step of modifying the display of the icons 42 which has become impossible to be specified in accordance with the contents of the prior prosess function for which the location has been determined. The contents of the display modification of the icon 42 are determined with reference to the second table stored in advance in the ROM 12 or the hard disk 14.

FIG. 12 shows an example of a second table. The second table shows whether the contents and applicable position of a process function are simultaneously selectable with the contents and applicable position of another process function. In the second table shown in FIG. 12, the symbol "○" denotes a simultaneously selectable combination, while symbol "x" denotes a not simultaneously selectable (exclusive) combination. The symbol "□" denotes a combination which can be set up either simultaneously selectable or not simultaneously selectable, i.e., exclusive, depending on the user's instruction. The present embodiment will be described below using a case of a combination indicated by the symbol "□" being set up for not simultaneously selectable as an example.

The CPU 11 identifies the contents of the prior process function whose application location has been already determined and its application location from the second table, and extracts process functions that cannot be selected simultaneously. It is preferable in this step that only those process functions which are non-selectable at all are extracted regardless of which position specifiable areas 44a-44c are specified. In other words, it is preferable that process functions that can be simultaneously selectable depending on the contents of the specification of position specifiable areas 44a-44c are not extracted. Next, the icons 42 corresponding to the simultaneously non-selectable process functions that are extracted are displayed with a modified color and/or brightness. Those icons 42 whose displays have been modified can no longer be specified.

More specific descriptions will be made below using FIG. 11. In FIG. 11, it is shown that the process function of stapling the printing paper using two stapling needles is to be applied in the center of the left edge of the printing paper. The CPU 11 identifies in the second table shown in FIG. 12 this process function (displayed as "Stapling two locations; left edge center" in the second table) and extracts not simultaneously selectable processes ("x" and "□"). In this example, the stapling process functions for stapling with one or two stapling needles, the center folding process function, and the center stapling process function are extracted as not simultaneously selectable processes. As a consequence, the displays for the icons 42a and 42b corresponding to the stapling process functions, the icon 42g corresponding to the center folding process function, and the icon 42h corresponding to the center stapling process function are modified. Moreover, it is set up in such a way that these icons, 42a, 42b, 42g, and 42h cannot be specified.

Next, a judgment is made as to whether there is a printing execution instruction or not in FIG. 5 (step S119). The printing instruction is performed by the user, for example, pressing the button of the input device 16 while the cursor 43 is pointing at the printing button 45 on the operating screen. If there is no printing execution instruction (step S119: No), a judgment is made as to whether the process termination is instructed or not (step S120). The termination of a process is instructed by pressing the button of the input device 16 while the cursor 43 is pointing at a cancel button 46 of the operating screen or a close button 47 of the dialog box. When the termination of a process is instructed (step S120: Yes), the process will end as is. On the other hand, if the process termination is not instructed (step S120: No), the current processing returns to the step S106 of FIG. 4 and the processes after the step S106 continue to be executed.

In the processes after the step S106, pressing the button of the input device 16 while the cursor 43 is pointing at the icon 42 (step S106: Yes), a new process function is selected (step S107) and the position specifiable areas 44a through 44c are set up (step S108).

Since the process function for which the location of application has already been determined exists (step S109: Yes), the position specifiable areas 44a through 44c for the newly selected process function are modified in accordance with contents and the applicable location of the prior process function for which the application location has been determined (step S110). In other words, the setting up the areas 44a through 44c includes a step of modifying at least one area 44a through 44c where the position can be instructed for the newly selected process function, in correspondence with the prior process function for which the application location has been determined and the location thereof. The position specifiable areas 44a through 44c are modified with reference to the second table shown in FIG. 12.

The CPU 11 identifies the contents of the prior process function whose application location is already determined and its application location from the second table, and further identifies the process function that is newly selected in the step S107. As a result, simultaneously selectable position specifiable areas will be extracted for the newly selected process function.

Figure 13:
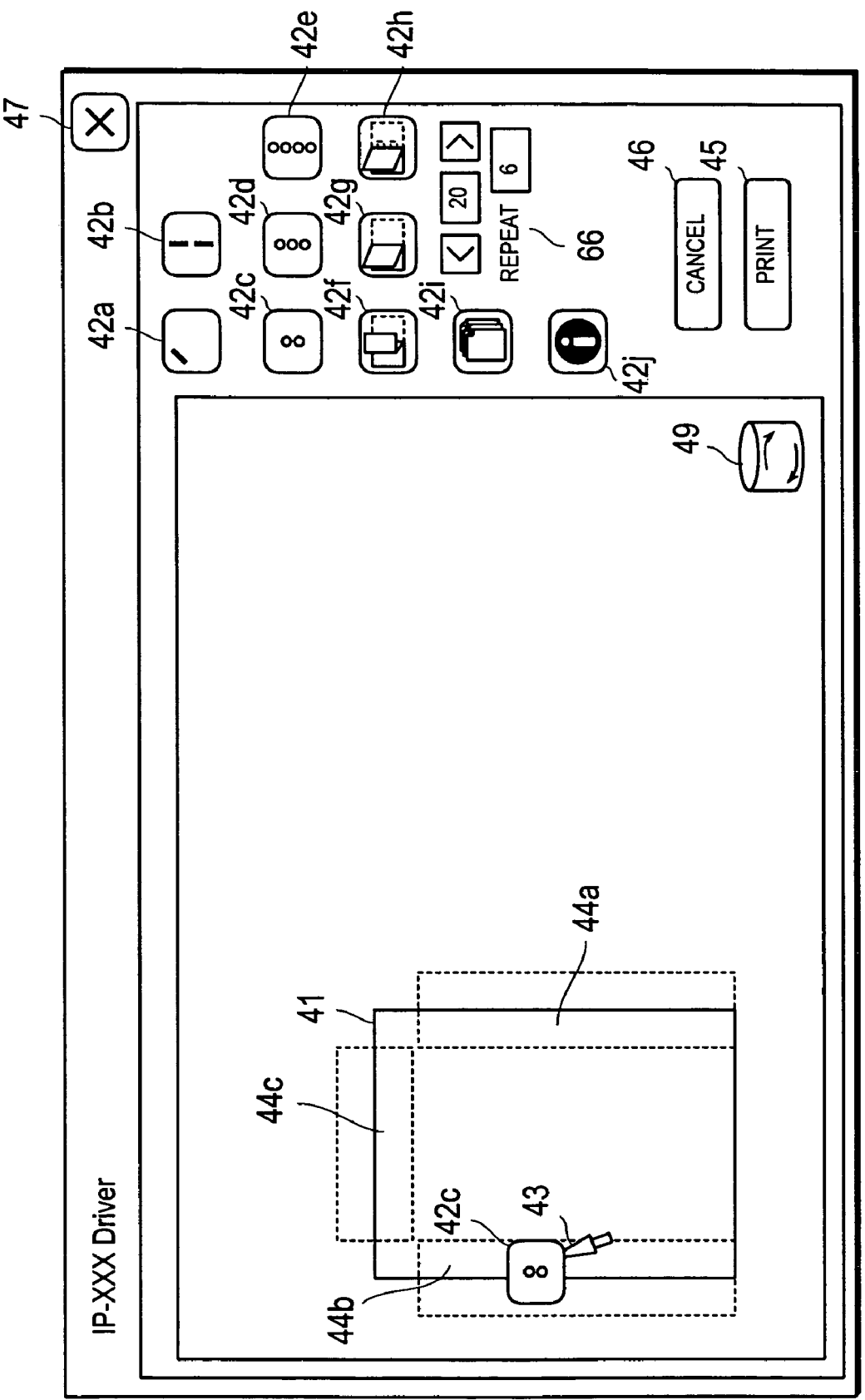
Figure 14:
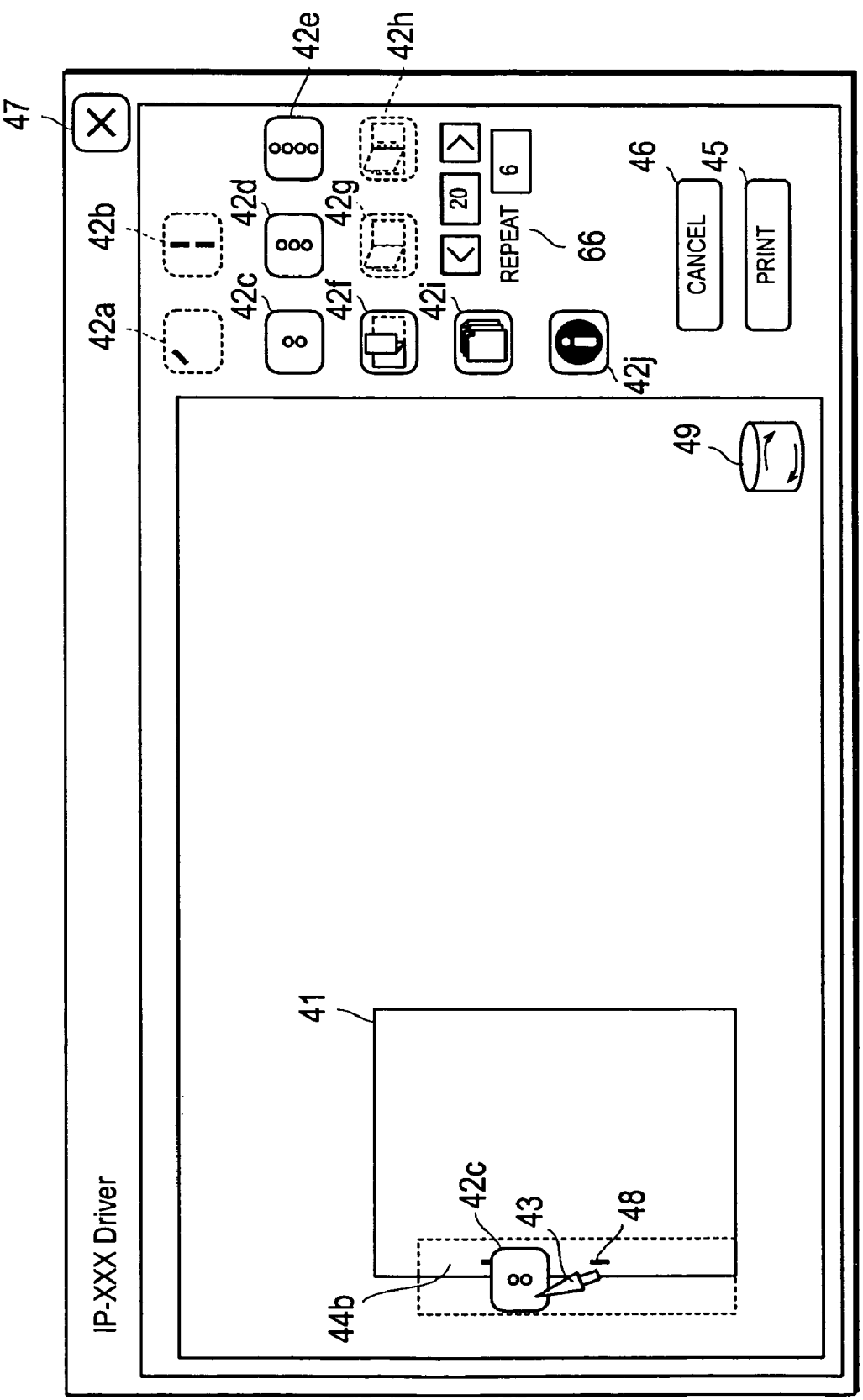

FIG. 13 and FIG. 14 show the position specifiable areas for the two hole punching process function. FIG. 13 shows a case where no place has been assigned to any process function, and FIG. 14 shows a case where a prior process function for stapling with two staple needles has already been assigned to a location in the center of the left edge of the printing paper. In a status shown in FIG. 14, the CPU 11 identifies in the second table of FIG. 12 a prior process function (displayed as "Stapling two locations; left edge center" in the second table), for which the application location has been determined, and extracts the position specifiable areas for the hole punching process function. As a result, only the area 44b in the center of the left edge of the paper is extracted as a position specifiable area among the areas 44a, 44b, and 44c in the center of the right edge, the center of the left edge, and the center of the top edge of the printing paper respectively. Therefore, the CPU 11 sets up only the area 44b in the center of the left edge of the printing paper as the position specifiable area in FIG. 14. In other words, the CPU 11 modifies the position specifiable areas from the status of FIG. 13 to the status of FIG. 14 depending on the process function for which a location has been determined for its application.

After selections of various process functions and their locations of applications have been completed as shown in the above, and upon receiving the printing execution instruction (step S119 of FIG. 5: Yes), the print data including the contents of the selected process functions and the information of their locations of applications is prepared (step S121). Next, the prepared print data is transmitted to the printer 2 (step S122). As a result, the printer 2 can execute various processes in accordance with the received print data. Since the details of the data format of the print data is similar to those in the conventional method, no description is provided here.

As can be seen from the above, according to the printer controlling method shown in FIG. 4 and FIG. 5, process functions are selected upon receiving the instruction for the icons 42, and the locations on the printing paper illustration 41 are specified, thus determining the locations where the process functions are applied. Thus, it is easy to specify the locations to which the process functions are to be applied on the printing paper confirming visually. The user can easily grasp the relation between the icon 42 that corresponds to the process function and the process function's application location since the process function's application location can be specified by moving the specified icon 42 to one of the position specifiable areas 44a through 44c on the printing paper illustration 41.

Moreover, the icon 42 is specified out of the displayed icon by pressing the button of the input device 16 while the cursor 43 is pointing at the icon 42, whereas the instruction for the position on the printing paper illustration 41 is accomplished by moving the cursor 43 while the button of the input device 16 is being pressed and releasing the button of the input device 16 as the cursor 43 is pointing at one of the position specifiable areas 44a through 44c, consequently allowing the selection of the process function and its application location by means of only one button of the input device 16 and the cursor 43.

Also, since the position specifiable areas 44a through 44c are set up in accordance with the contents of the selected process functions, appropriate locations can be selected. Since the position specifiable areas 44a through 44c are displayed on the printing paper illustration 41, the user can specify the desired locations by visually checking them on the printing paper to which the process functions are applied.

Furthermore, since the display of the icons 42 is modified as the time goes by depending on the contents of the prior process functions whose application locations have already been determined, modifying the displays of the icons that are no longer specifiable, mistakes of selecting a process function which is not simultaneously selectable can be prevented from happening. Similarly, since the position specifiable areas 44a through 44c are modified for the process function to be selected anew in accordance with the contents of the process functions whose application locations have been determined, mistakes of selecting a process function which is not simultaneously selectable can be prevented from happening.

The abovementioned process sequence indicated in FIG. 4 and FIG. 5 can be arbitrarily modified. For example, the process order for the steps S102 and S103 can be reversed. Further, the paper setup instruction (step S105), the printing execution instruction (step S119), and the process ending instruction (step S120) can be executed as interruption processes.

In the above description, it was described that an icon is specified by pressing the button of the input device 16 while the cursor 43 is pointing at one of the icons 42, and a position on the printing paper illustration 41 is instructed by moving the cursor 43 while the button of the input device 16 is pressed and releasing the button of the input device 16 while the cursor is pointing at one of the areas that can be specified. However, it is possible to specify the icons 42 and a position on the printing paper illustration by other methods.

For example, the icons 42 can be specified by clicking the button of the input device 16 while the cursor 43 is pointing at one of the icons 42, and a position on the printing paper illustration 41 can be instructed by clicking the button of the input device 16 again while the cursor 43 is in one of the areas that can be specified. "Clicking" here means an action of pressing and releasing the button of the input device 16.

Paper Setup

Figure 15:
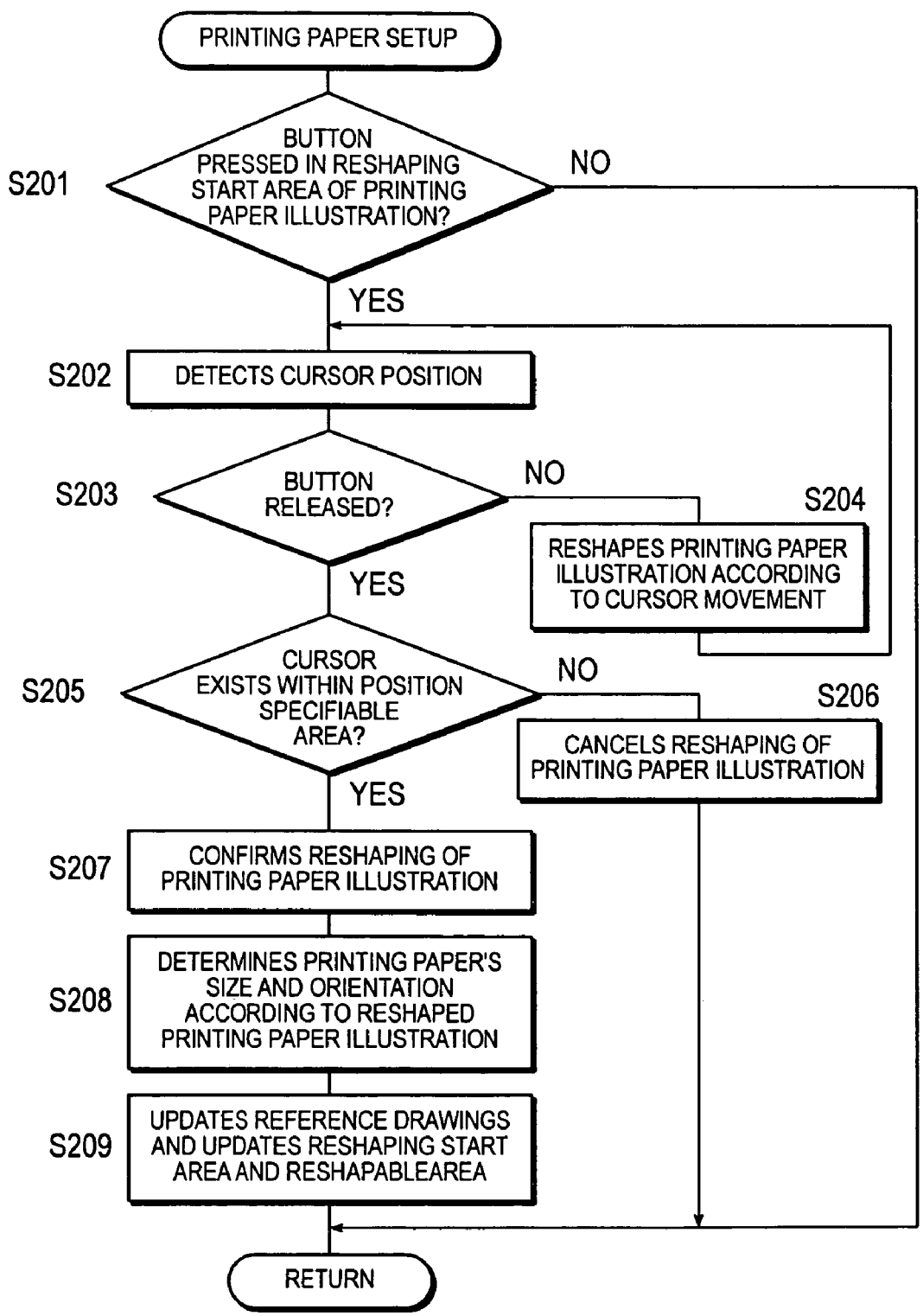
FIG. 15 is a flowchart for describing the printing paper setup process shown in the step S105 of FIG. 4.

Next, the paper setup process shown in the step S105 of FIG. 4 will be described. FIG. 15 is a flowchart showing the sequence of the paper setup process. FIG. 15 corresponds to a subroutine describing the contents of the step S105 of FIG. 4. Therefore, as a premise of the printing paper setup process, a process of displaying the printing paper illustration 41 on the operating screen (step S102) and a process of displaying a plurality of reference drawings that correspond to various paper sizes and/or orientations on the operating screen (step S104) are executed.

First, a judgment is made as to whether the button of the input device 16 is pressed or not while the cursor 43 is pointing at a specific reshaping start area (also called "resizing handle") or not (step S201) on the displayed printing paper illustration 41. The reshaping start area is an area for accepting an instruction for converting the printing paper illustration 41 into a reshapable state, preferably provided on the outer edge (in particular in the corner) of the printing paper illustration 41. Pressing the button of the input device 16 while the cursor 43 is pointing at the printing paper illustration 41 makes the printing paper illustration 41 to be in a reshapable status.

If the button of the input device 16 is not pressed while the cursor 43 is pointing at the reshaping start area of the printing paper illustration 41 (step S201: No), the current processing returns to the flowchart of FIG. 4. On the other hand, if the button of the input device 16 is pressed while the cursor 43 is pointing at the reshaping start area 51 of the printing paper illustration 41 (step S201: Yes), the current processing advances to the process shown in the step S202 and thereafter.

Figure 16:
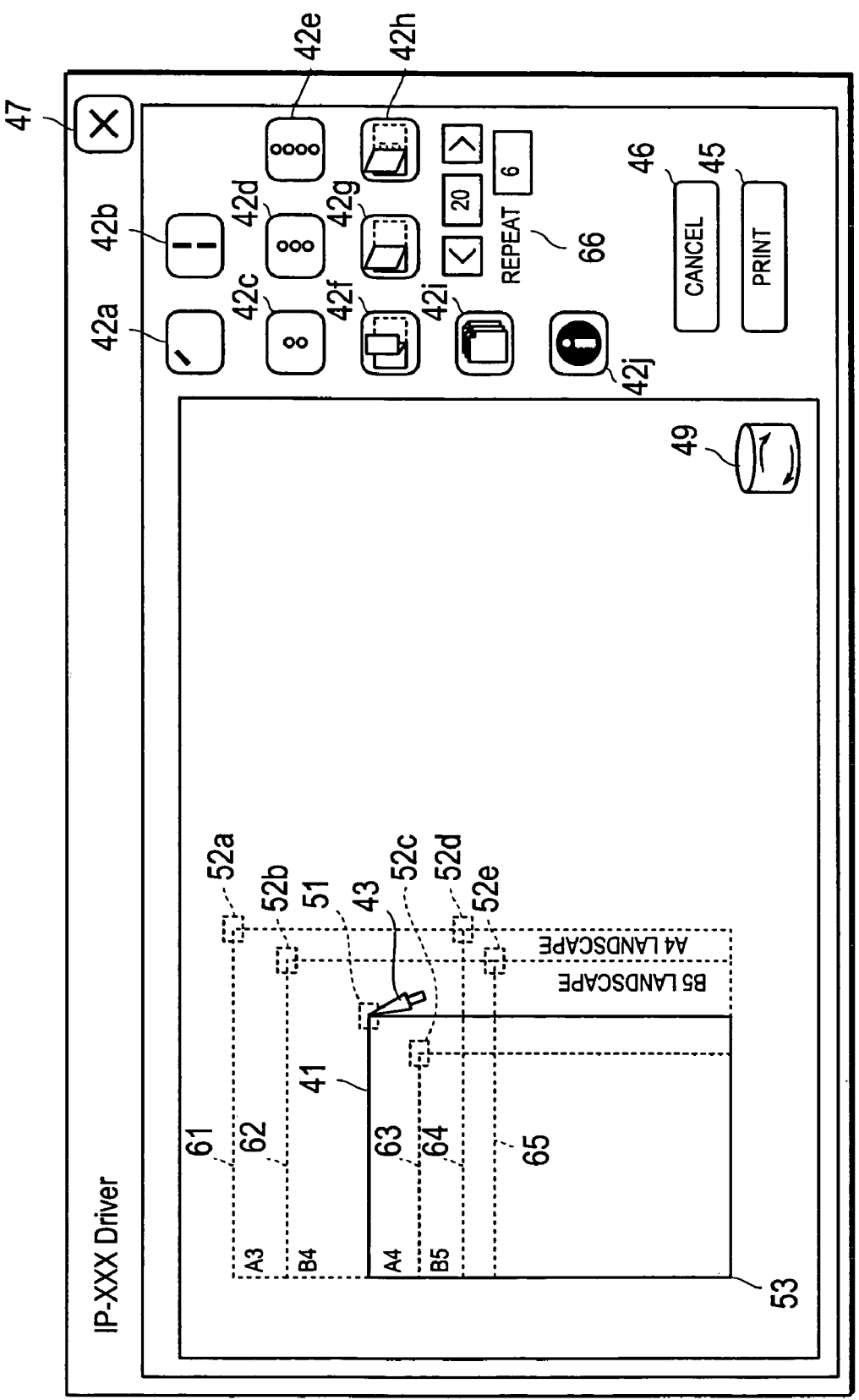
FIG. 16 shows an example of the operating screen showing reference drawings.

FIG. 16 is a diagram showing an example of the operating screen. The operating screen shown in FIG. 16 is identical to that in FIG. 6 except that it shows the parts that are related to the paper setting process (particularly various reference drawings) without any omission. The operating screen of FIG. 16 shows the printing paper illustration 41 that corresponds to the A4 size paper oriented in a portrait position as an example. It also shows reference drawings 61 through 65 of various paper sizes and/or orientations different from that of the printing paper illustration 41. The reference drawings 61 through 65 correspond to A3 size portrait, B4 size portrait, B5 size portrait, A4 size landscape, and B5 size landscape respectively. The reference drawings 61 through 65 are referenced when setting the size and/or orientation of the printing paper by reshaping the printing paper illustration 41.

In the example shown in FIG. 16, one of the apexes of the printing paper illustration 41 is used as the fiduciary point 53 and the reshaping start area 51 is provided at the corner of the printing paper illustration 41 located diagonally opposite to the fiduciary point 53. When the button of the input device 16 is pressed while the cursor 43 is pointing at this reshaping start area 51, the printing paper illustration 41 becomes a reshapable state. The shape of the cursor 43 can be modified in order to show that the cursor 43 is pointing at the reshaping start area 51.

Next, the process of the step S202 and thereafter will be described below. The process of the steps S202 through S207 corresponds to the process of reshaping the printing paper illustration 41 upon receiving the instruction for the reshaping location on the operating screen.

As long as the position of the cursor 43 is detected (step S202) and the button of the input device 16 is pressed (step S203: No), the printing paper illustration 41 is reshaped in correspondence with the movement (drag) of the cursor 43 (step S204). More specifically, a new printing paper illustration 41 is displayed with the current position of the cursor 43 as the new corner. In other words, the printing paper illustration 41 is reshaped in such a way that a line connecting the previously mentioned fiduciary point 53 and the current position of the cursor 43 becomes its diagonal line. However, when the process of the step S204 is being executed, the reshaping of the printing paper illustration 41 is not finalized. Therefore, it is preferable to display the reshaped printing paper illustration 41 with modified color or brightness to indicate that the reshaping has not be finalized.

Next, as the button of the input device 16 is released (step S203: Yes), a judgment is made as to whether the position of the cursor 43 is located within reshapable areas when the button is released (step S205). The reshapable area means an area where the reshaping location can be instructed. As can be seen from FIG. 16, the reshapable areas 52a through 52e are indicated by the outer edges (particularly the corners) of the reference drawings 61 through 65. Thus it is easy to judge whether the cursor 43 is pointing at one of the reshapable areas 52a through 52e when the button of the input device 16 is being pressed. The process of releasing the button while the cursor 43 is within the specified area corresponds to the cursor process of dropping an object.

If the position of the cursor 43 when the button of the input device 16 is released is not within the reshapable areas 52a through 52e (step S205: No), it is judged that the user abandoned the attempt of the printing paper setup. Therefore, the current processing returns to the flowchart of FIG. 4 after the attempt of specifying the reshaping location of the printing paper illustration 41 is cancelled (stepS206). On the other hand, if the cursor 43 is located within one of the reshapable areas 52a through 52e when the button of the input device 16 is released (step S205: yes), the reshaping of the printing paper illustration 41 will be finalized in such a way as to have the same size and orientation as the reference drawing the cursor 43 is pointing at (step S207) Thus, the instruction for the reshaping position of the printing paper illustration 41 is done by dragging the outer edge of the printing paper illustration 41 and dropping it. It can also be constituted in such a way that the instruction for the reshaping location is construed to be canceled if the outer edge is dropped outside the reshapable areas 52a through 52e.

Next, the printing paper size and/or orientation is determined in accordance with the reshaped printing paper illustration 41 (step S208). More specifically, the size and/or orientation of the printing paper are determined in accordance with the printing paper illustration 41 whose reshaping has been finalized.

Next, as the size and/or orientation of the printing paper illustration 41 are updated as the result of the finalization of the reshaping, all the reference drawings will be updated in accordance with the paper size and/or orientation of the printing paper which are different from those of the new printing paper illustration 41, and the reshaping start areas 51 on the printing paper illustration 41 as well as the reshapable areas on the reference drawings will be updated (step S209). In other words, the process of the step S209 corresponds to a process of updating the reshapable areas.

Figure 17:
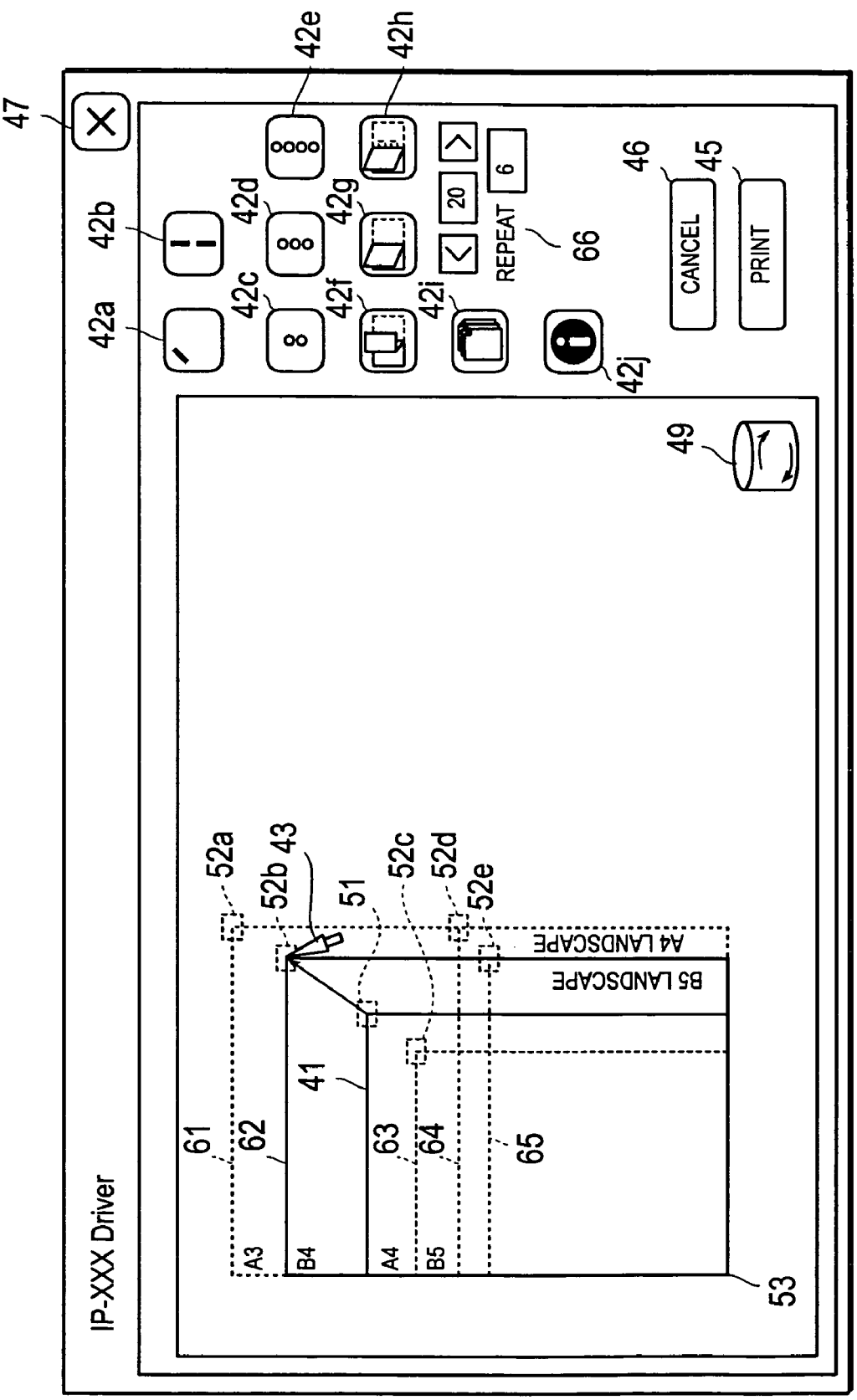
FIG. 17 shows an example of the operating screen showing the cursor pointing at a reshapable area.
Figure 18:
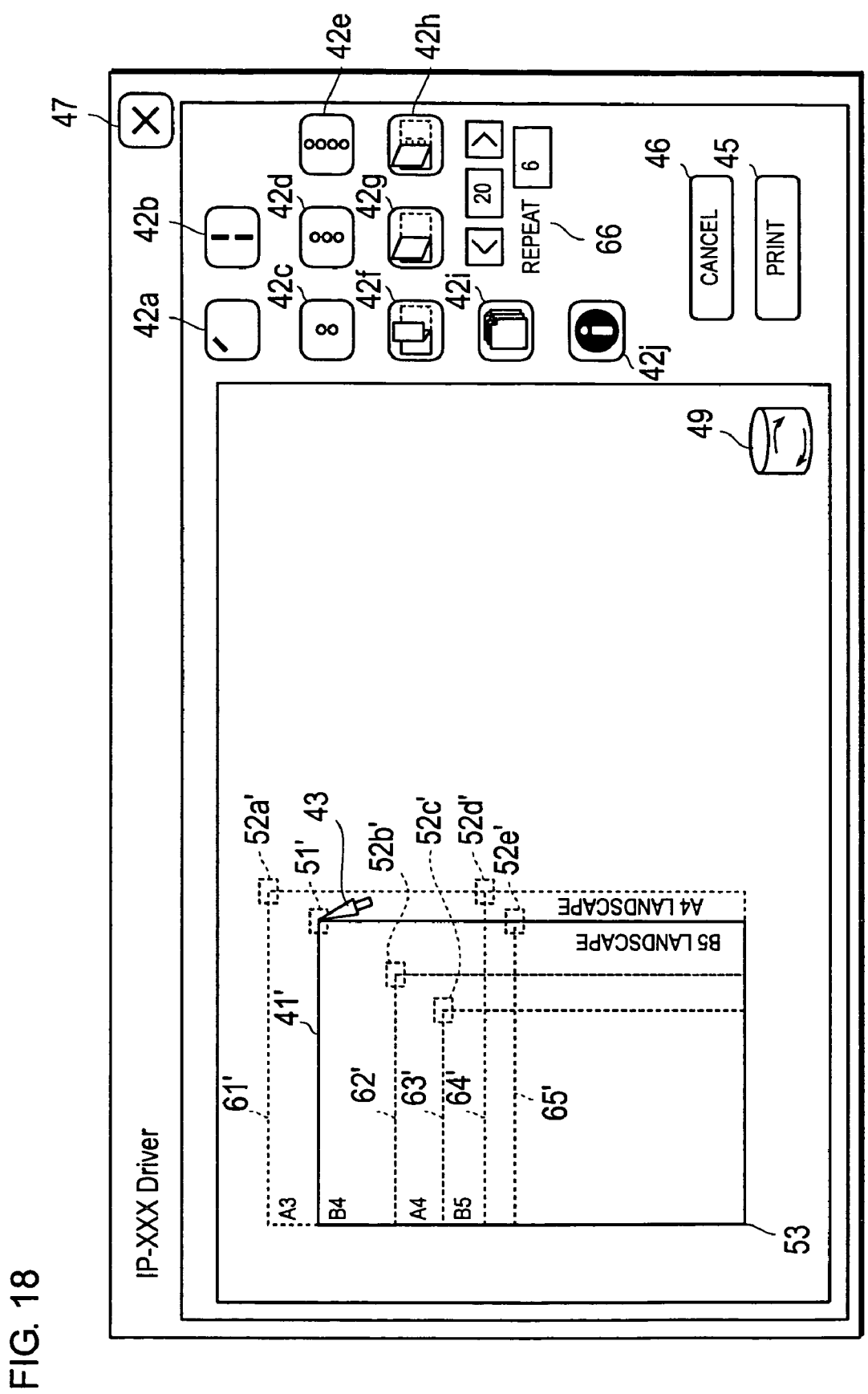
FIG. 18 shows an example of the operating screen showing a reshaping of the printing paper illustration.

FIG. 17 shows a status where the cursor 43 is pointing at the reshapable area 52b. The reshapable area 52b is set up here at a corner of the reference drawing 62 that corresponds to the B4 portrait size paper. Therefore, when the button of the input device 16 is released during the status shown in FIG. 17, the printing paper illustration 41 is reshaped to 41' that corresponds to the B4 portrait size paper as shown in FIG. 18. The reference drawings are updated also to the reference drawings 61' through 65' of A3 size portrait, A4 size portrait, B5 size portrait, A4 size landscape, and B5 size landscape respectively. The outer edge of the printing paper illustration after reshaping 41' is provided with a new reshaping start area 51' is set up, while the outer edge of each of the reference drawings 61' through 65' is provided with a new reshapable areas 52a' through 52e'. In other words, the reshaping start area 51' as well as reshapable areas 52a' through 52e' are updated properly in accordance with the reshaping of the printing paper illustration 41. As a result of the reshaping of the printing paper illustration 41' shown in FIG. 18, the B4 size portrait paper is set up.

Figure 19:
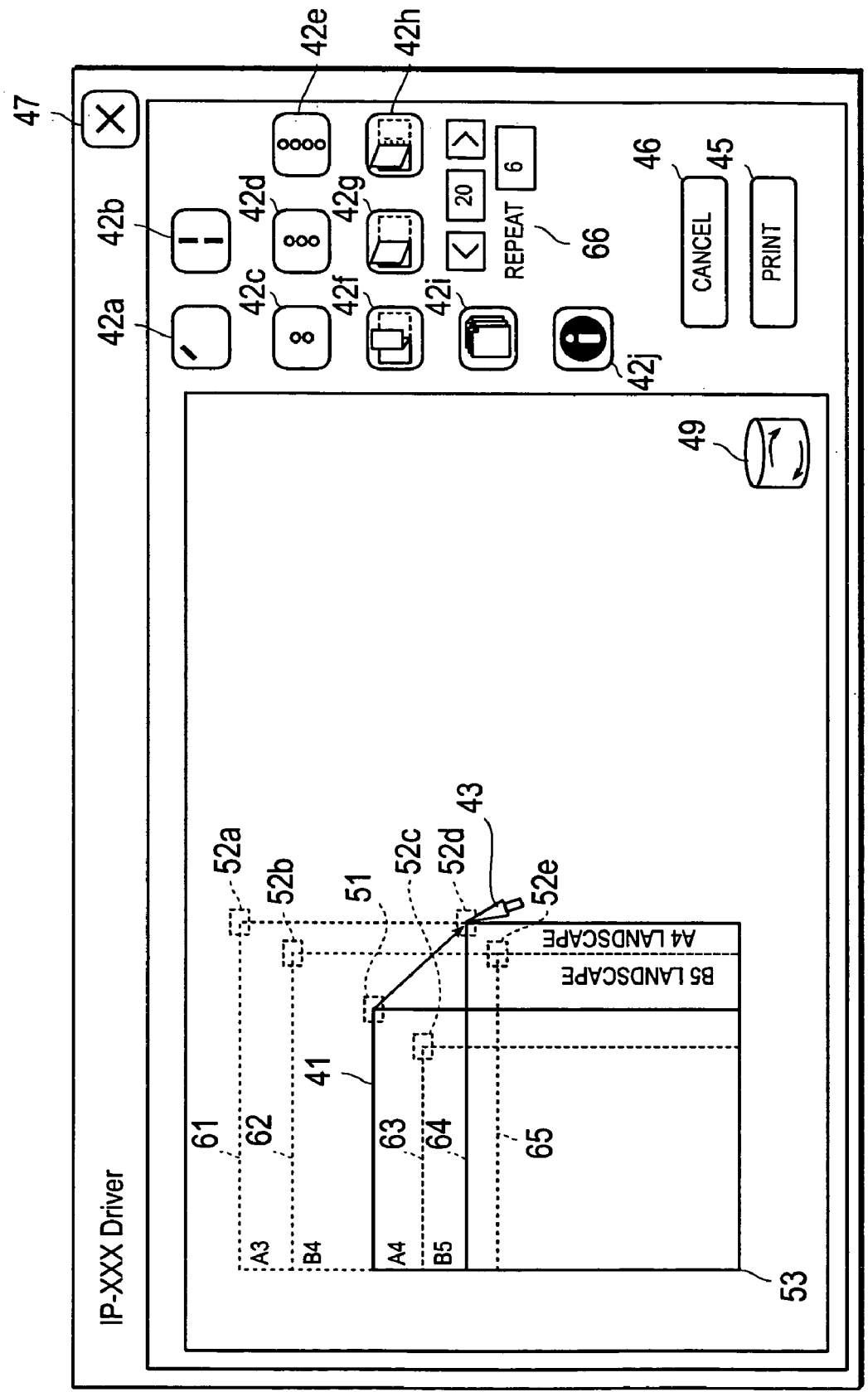
FIG. 19 shows an example of the operating screen showing another reshaping of the printing paper illustration.
Figure 20:
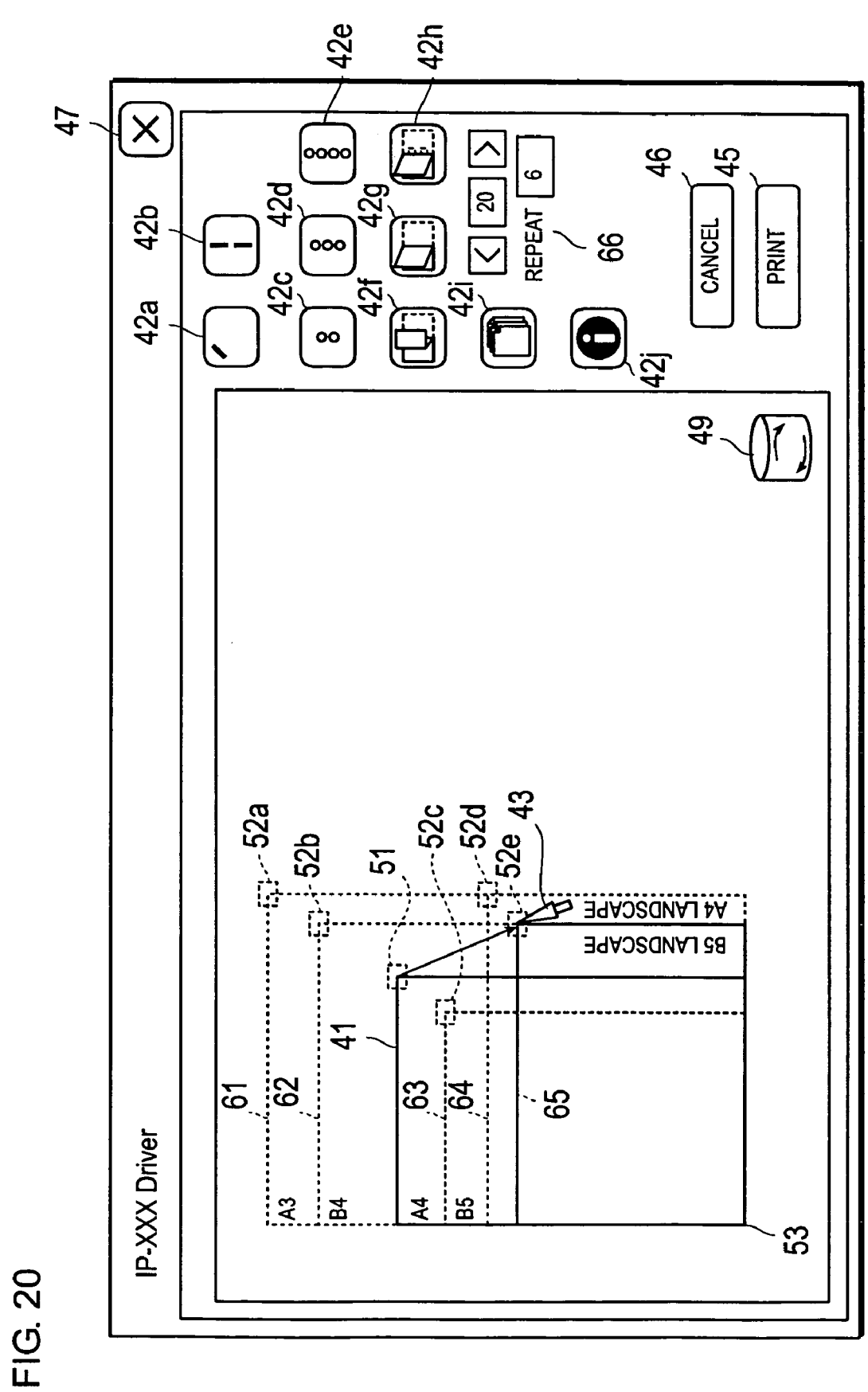
FIG. 20 shows an example of the operating screen showing yet another reshaping of the printing paper illustration.

Although a case of setting up the paper size in accordance with the reshaping of the printing paper illustration 41 using FIG. 17 and FIG. 18, the paper orientation can be set up as shown in FIG. 19 in accordance with the reshaping of the printing paper illustration 41 or both the paper size and the orientation can be set up as shown in FIG. 20 in accordance with the reshaping of the printing paper illustration 41.

According to the printer's controlling method shown in FIG. 15, the user can set up the paper size and/or the orientation thoroughly checking them visually as the printing paper illustration 41 is reshaped with the movement of the cursor 43 and the paper size and/or orientation are determined in accordance with the reshaped printing paper illustration 41.

The editing process used in the conventional CAD (computer aided design) system invariably determines the reshaping of a figure with the specified position as the apex on the operating screen no matter how the location is specified. On the contrary, in case of the present embodiment, the reshapable areas 52a through 52e are set up in correspondence with the paper size and/or orientation and the reshaping of the printing paper illustration 41 is unilaterally determined only when the location is specified within the reshapable areas 52a through 52e, while the reshaping of the printing paper illustration 41 is released if the location is specified on the outside of the reshapable areas 52a through 52e.

If the position is instructed within a reshapable area (e.g., 52b), the reshaping of the printing paper illustration 41 is determined not in accordance with the location in the particular reshapable area 52b, but rather in accordance with the size and/or orientation of the predetermined reference drawing (reference drawing 62 in this case). Therefore, the mistake of choosing non-selectable paper size and/or orientation can be prevented from happening.

The abovementioned process sequence indicated in FIG. 15 can be arbitrarily modified. For example, the printing paper illustration 41 can be reshaped by clicking the button of the input device 16 while the cursor 43 is pointing the printing paper illustration 41, and the reshaping position can be insuructed by clicking the button of the input device 16 again while the cursor 43 is in one of the reshapable areas.

Although it was described in the above that the reshapable areas 52a through 52e are provided on the outer edge of the reference drawings 61 through 65 (particularly at the corners), the invention is not limited by it, as the sizes, locations and shapes of the reshapable areas 52a through 52e can be determined arbitrarily.

It is also possible to show thumbnails on the printing paper illustration 41. A thumbnail here means a miniature image produced by reducing the image that corresponds to, for example, the print data of a specific page (e.g., the first pate). Since the conversion method itself from the print data to the thumbnail is identical to the prior art, so that detailed descriptions are omitted.

Displaying Printing Paper Illustration for Multiple Pages

Next, a case of displaying a printing paper illustration of multiple pages is described. The previously mentioned paper insertion function allows us to insert a sheet of paper of various sizes, orientations, and colors between the specified pages of printed paper (e.g., between page 20 and page 21). However, simply specifying a page number sometimes caused confusions as the printer drivers of different printer manufacturers have different specifications and it is not clear whether the insertion paper is to be inserted before or after the specified page number.

In this embodiment, an illustration showing consecutive multiple pages, i.e., a printing paper illustration representing a consecutive pages of printing paper is displayed on the operating screen. The insertion location of the insertion paper is determined by receiving an instruction for the position on the printing paper illustration. Therefore, the insertion location can be determined by visually confirming it.

Figure 21:
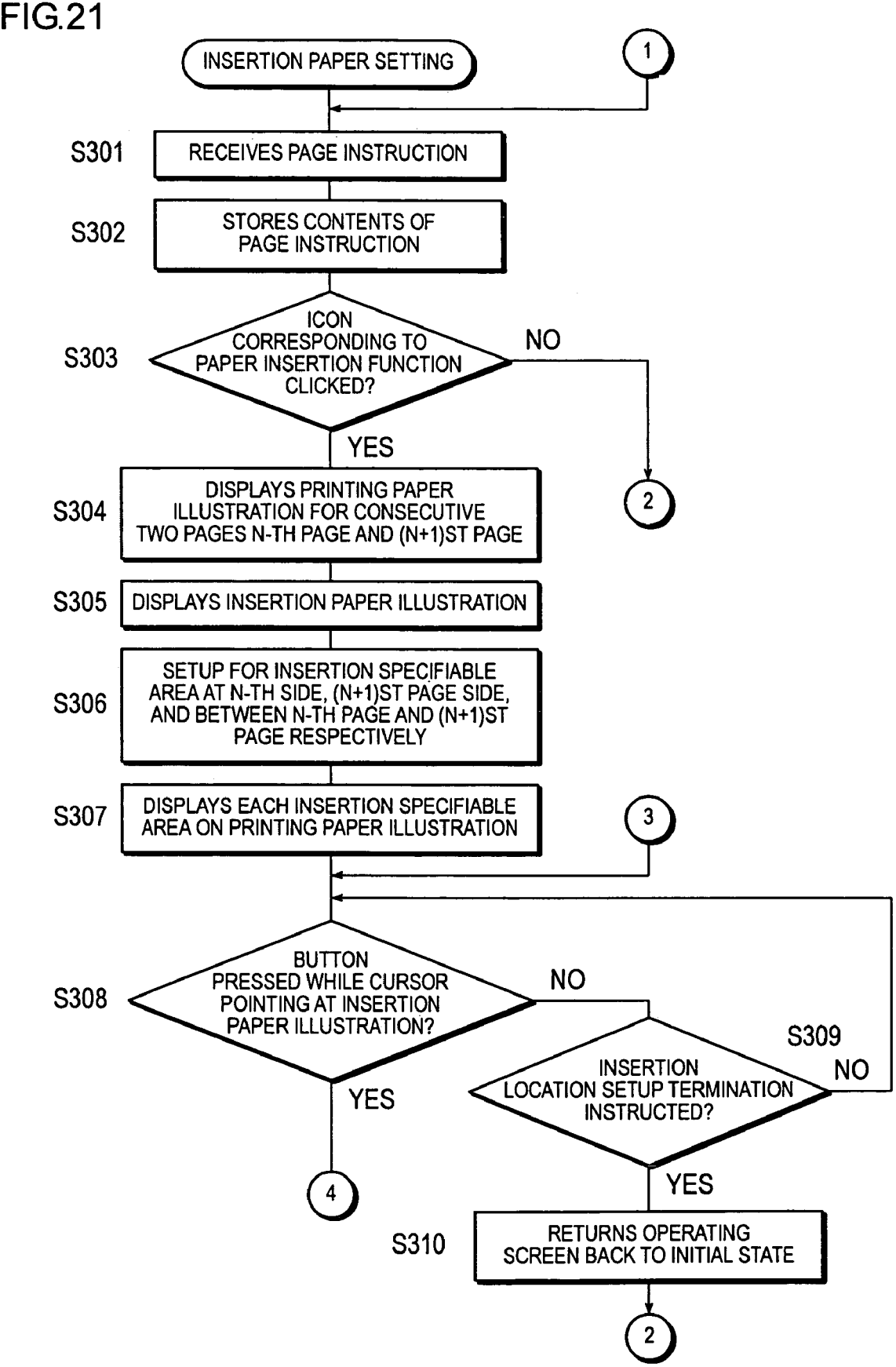
FIG. 21 is a flow chart showing a process sequence by the computer terminal for setting up a paper insertion location.
Figure 22:
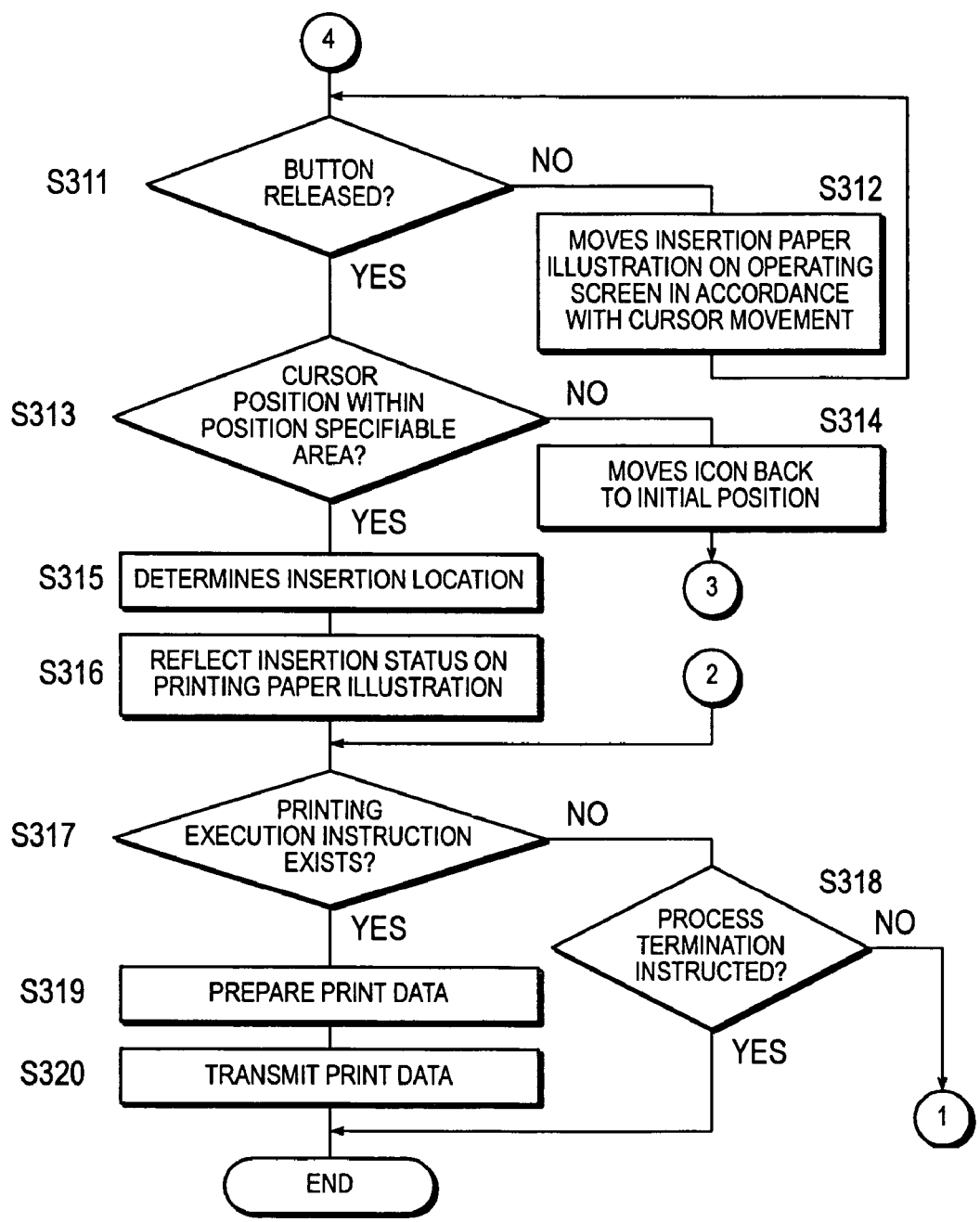
FIG. 22 is a flowchart that follows FIG. 21.

FIG. 21 and FIG. 22 represent flowcharts showing the inserting location setup process procedure for the insertion paper. The algorithm shown in the flowcharts of FIG. 21 and FIG. 22 is stored as a program in a memory unit such as the hard disk 14 of the PC 1 and executed by the CPU 11.

First of all, upon receiving the reference page designation, the fiduciary for the paper insertion (step S301), the PC1 stores the contents of the page designation into the RAM 13 or the hard disk 14 (step S302). For example, as the user enters a specific page number "n" in the page designator 66 shown in FIG. 6, the page designation is accepted and the page number is stored. The page number 20 is entered in the case shown in FIG. 6. It is also possible to specify the insertion repeat function in which the insertion paper is inserted every so many pages (insertion interval) from the specified page as a fiduciary. In this case, the user shall enter a specific page number "n" into the page designator 66 as well as the number of pages corresponding to the insertion interval. The processing of step S301 and step S302 indicates a step of receiving an instruction for specifying pages for inserting the insertion paper.

Next, a judgment is made as to whether the icon 42$i$ (refer to FIG. 6) that corresponds with the paper insertion function is clicked or not (step S303). If the icon 42$i$ is not clicked (step S303: No), it is judged that the paper insertion function is not selected so that the current processing advances to the step S317 of FIG. 22. On the other hand, if the icon 42$i$ is clicked (step S303: Yes), the current processing advances to the process of the step S304 and thereafter.

First, the printing paper illustrations 41$a$ and 41$b$ are displayed for the consecutive pages (two pages in this case) (S304). For example, the printing paper illustration of the multiple pages including the page (n-th page) specified in the step S301 is displayed on the operating screen. In other words, the two printing paper illustrations of the consecutive n-th and (n+1)st pages are displayed using the page number "n" entered in the step S301 as the fiduciary. It is preferable that each page number (n-th and n+1$^{st}$ page) is displayed on each printing paper illustration. Also, in addition to the printing paper illustrations of multiple pages, an illustration representing the insertion paper ("insertion paper illustration") is displayed (step S305). As a result, multiple pages of printing paper illustrations and the insertion paper illustration are displayed on the operating screen.

Figure 23:
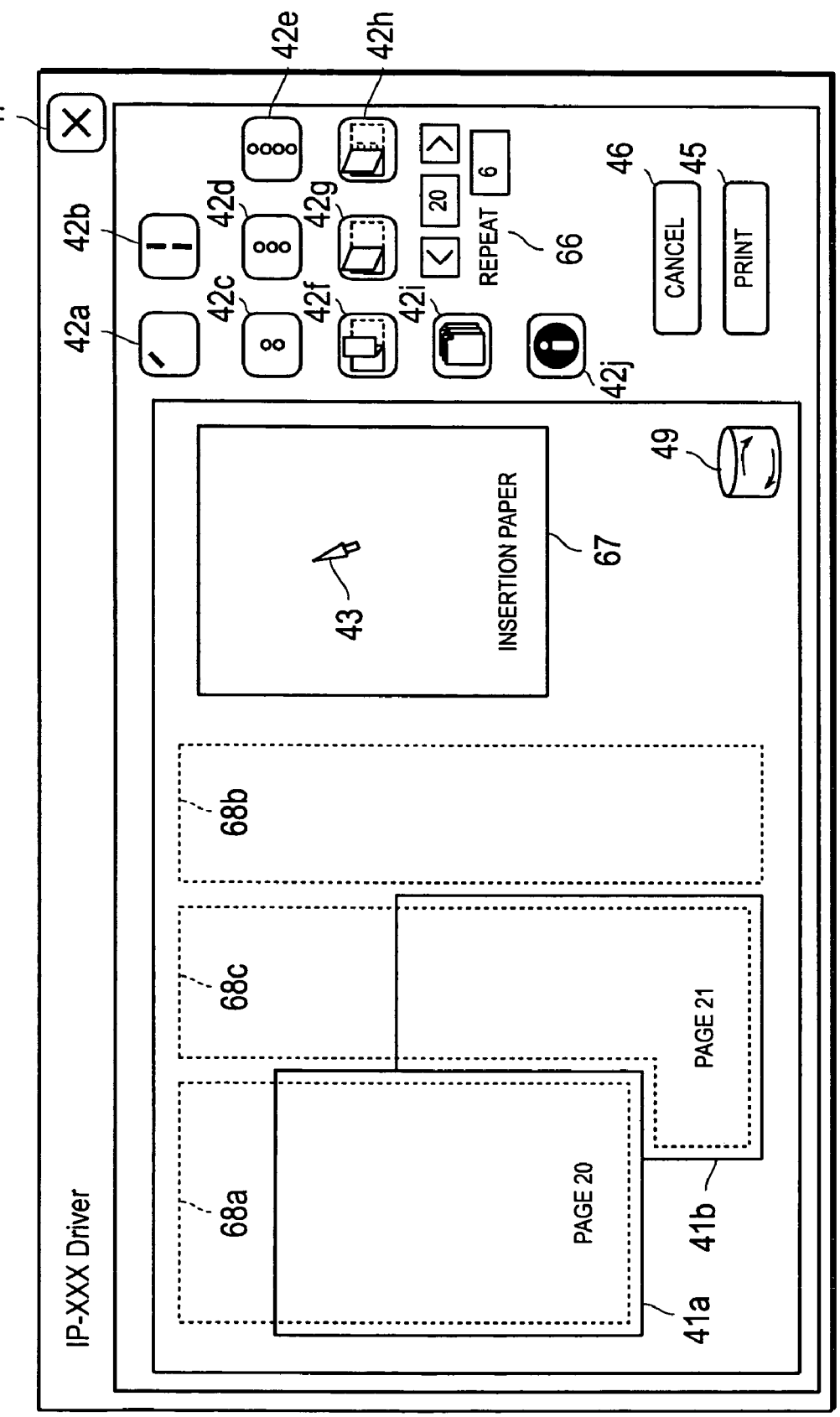
FIG. 23 shows the operating screen where two pages of printing paper illustrations and an insertion paper illustration are displayed.

FIG. 23 is a diagram showing two pages of printing paper illustrations 41$a$ and 41$b$ and an insertion paper illustration 67. The insertion paper illustration 67 can be a subject of the drag and drop manipulation. In other words, the insertion paper illustration 67 functions as a kind of the icons 42 described using FIG. 4 and FIG. 5. The user presses the button of the input device 16 while the cursor 43 is pointing at the insertion paper illustration 67, moves the cursor 43 while keep pressing the button (drag), and releases the button of the input device 16 at a different location (drop) to move the insertion paper illustration 67 on the operating screen. Thus, it can be constituted in such a way that a new icon (the insertion paper illustration 67 in this case), which is the subject of the drag and drop procedure, is displayed by performing a triggering process such as clicking the icon 42$i$.

Next, an area whose position relative to the insertion of the insertion paper can be specified ("insertion specifiable area") is set up on the printing paper illustrations 41$a$ and 41$b$ (step S306). For example, as shown in FIG. 23, the n-th page side (20$^{th}$ page side) area 68$a$, the (n+1$^{st}$) page side (21$^{st}$ page side) area 68$b$, the area between the n-th page and the (n+1$^{st}$) page (area between the 20$^{th}$ page and the 21$^{st}$ page) 68$c$ are set up as insertion specifiable areas.

The insertion specifiable areas 68$a$, 68$b$, and 68$c$ are displayed on the printing paper illustrations 41$a$ and 41$b$ (step S307). For example, similar to FIG. 9, the insertion specifiable areas 68$a$, 68$b$, and 68$c$ are displayed on the printing paper illustrations 41$a$ and 41$b$ and their vicinities by partially modifying the colors and/or brightness of the printing paper illustrations 41$a$ and 41$b$.

Next, a judgment is made as to whether the button of the input device 16 is pressed or not while the cursor 43 is pointing at the insertion paper illustration 67 (step S308). If it is judged that the button of the input device 16 is not pressed while the cursor 43 is pointing at the insertion paper illustration 67 (step S308: No), a judgment is made further as to whether the termination of the insertion location setup process is instructed or not (step S309). The termination of an insertion location setup process is instructed by pressing the button of the input device 16 while the cursor 43 is pointing at a cancel button 46 of the operating screen. When the termination of an insertion location setup process is instructed (step S309: Yes), the display on the operating screen returns to the initial state (step S310), and the current processing advances to the step S317 of FIG. 22. If the termination of an insertion location setup process is not instructed (step S309: No), the CPU 11 stands by until the button of the input device 16 is pressed (step S308: Yes)

On the other hand, if it is judged that the button of the input device 16 is pressed while the cursor 43 is pointing at the insertion paper illustration 67 (step S308: Yes), the current processing advances to the process shown at the step S311 of FIG. 22 and thereafter.

Next, a judgment is made as to whether the button of the input device 16 is released or not (step S311). If the button has not been released (step S311: No), the insertion paper illustration 67 moves in coordination with the movement of the cursor 43 (step S312). In other words, the process of the step S312 corresponds to a process of dragging the insertion paper illustration 67 by the cursor 43. Next, as the button of the input device 16 is released (step S311: Yes), a judgment is made as to whether the position of the cursor 43 is located within the insertion specifiable areas when the button is released (step S313). The process of releasing the button while the cursor 43 is within the specified area corresponds to the cursor process of dropping an object in the specified area. The insertion specifiable area here means an area where the position for inserting the insertion paper can be specified.

If the position of the cursor 43 is not within the insertion specifiable area (step S313: No), the insertion paper illustration 67 is returned to the initial position (step S314) and the current processing returns to the process of the step S308. On the other hand, if the cursor 43 is located within the insertion specifiable area (step S313: Yes), the insertion location of the insertion paper is determined by receiving the instruction for the position on the printing paper illustrations 41$a$ and 41$b$ based on the cursor 43 (step S315). The instruction for the location on the printing paper illustrations 41$a$ and 41$b$ is performed by moving the insertion paper illustration 67 into the insertion specifiable area.

More preferably, the insertion paper illustration 67 becomes movable on the operating screen by pressing the button of the input device 16 while the cursor 43 is pointing at the insertion paper illustration 67. The position on the printing paper illustrations 41a and 41b are specified by releasing the button of the input device 16 while the cursor 43 is located within the insertion specifiable area by moving the cursor 43 while pressing the button of the input device 16. In other words, the position on the printing paper illustrations 41a and 41b is instructed in this embodiment by dragging the insertion paper illustration 67 and dropping it within the insertion specifiable area where the position can be instructed. The insertion location of the insertion paper is determined upon receiving an instruction for the position on the printing paper illustration.

For example, in the abovementioned FIG. 23, if a position within the n-th page area ($20^{th}$ page area) 68a is instructed, the insertion location is determined in such a way that the insertion paper is to be inserted between the (n−1) page and the n-th page (between the $19^{th}$ page and the $20^{th}$ page). If a positiion within the (n+1)st page area ($21^{st}$ page area) 68b is instructed, the insertion location is determined in such a way that the insertion paper is to be inserted between the (n+1) page and the (n+2) page (between the $21^{st}$ page and the $22^{nd}$ page). If a position within the area 68c between the n-th page and the (n+1)st page is instructed, the insertion location is determined in such a way that the insertion paper is to be inserted between the n-th page and the (n+1)st page (between the $20^{th}$ page and the $21^{st}$ page). If the insertion repeat is instructed, the insertion paper is inserted repeatedly every specified number of pages using the determined insertion location as a fiduciary.

Next, in FIG. 22, the content of the paper insertion function, i.e., the status of paper being inserted is reflected on the printing paper illustrations 41a and 41b (step S316). For example, an illustration representing the positional relation between the multiple pages of printing paper and the insertion paper in accordance with the determined insertion location is displayed on the operating screen. For example, the positional relation between the printing paper illustrations 41a and 41b and the insertion paper illustration 67 is displayed.

Figure 24:
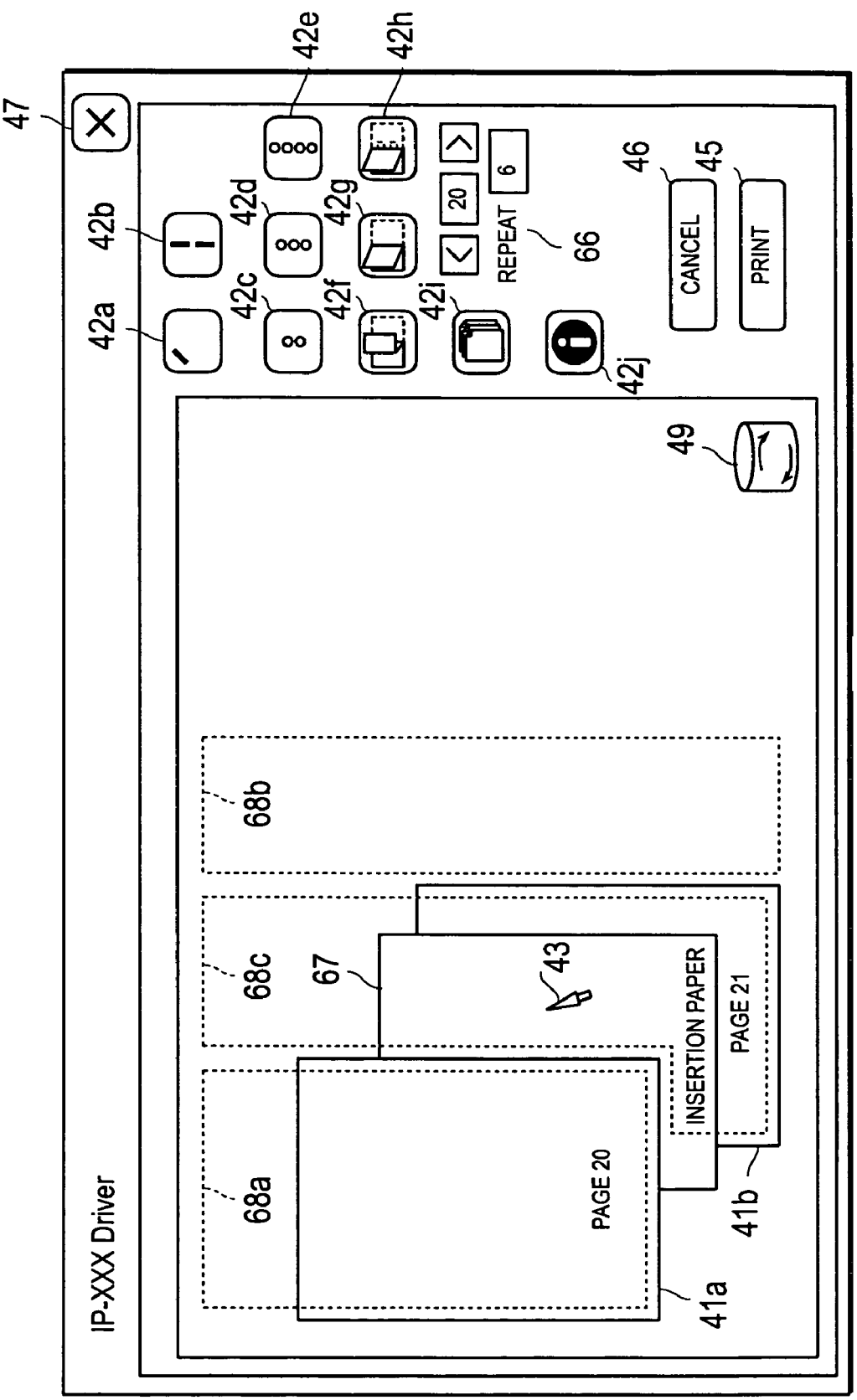
FIG. 24 shows the page insertion function on the printing paper illustration.

FIG. 24 shows a condition, in which the contents of the paper insertion function being reflected on the printing paper illustrations 41a and 41b. FIG. 24 shows a case where the designation of the area 68c between the n-th page and the (n+1) page causing the status of the insertion paper being inserted between the n-th page and the (n+1) page (between the $20^{th}$ page and the $21^{st}$ page). As a result, the user can visually confirm the actual insertion position.

The insertion paper illustration 67 is also used for canceling the process function for which the insertion location has been determined. For example, the user can cancel the paper insertion function by dragging to the cancellation area 49 and dropping there the insertion paper illustration 67 that corresponds to the paper insertion function that needs to be cancelled. More specifically, the user can cancel the paper insertion function by pressing the button of the input device 16 while the cursor 43 is pointing at the insertion paper illustration 67, moving the cursor 43 while keeping the button pressed (dragging), and then releasing the input device 16 in the cancellation area 49 (dropping).

Next, a judgment is made as to whether there is a printing execution instruction or not (step S317). The process of the steps S317 through the step S320 are identical to the process of the steps S119 through S122 of FIG. 5, so that the description is omitted here.

As can be seen from the above, the printer controlling method shown in FIG. 21 through FIG. 22 includes the page number being stored upon accepting the page designation (step S301, step S302) and the icon 42i (refer to FIG. 6) being clicked (step S303). However, it can be constituted in such a way that the icon 42i that corresponds to the paper insertion function is clicked first, and then the page number is specified.

In the above description, the insertion paper illustration becomes movable when the button of the input device 16 is pressed while the cursor 43 is pointing at insertion paper illustration, and the instruction for the position on the printing paper illustrations 41a and 41b is effectuated by moving the cursor 43 while keep pressing the button of the input device 16 and then releasing the button of the input device 16 while the cursor 43 is located within the insertion specifiable area. However, it is also possible to designate the positions on the printing paper illustrations 41a and 41b using other methods. For example, the position can be made instructed by clicking the button of the input device 16 while the cursor 43 is pointing at the insertion paper illustration, and the position on the printing paper illustrations 41a and 41b can be instructed by clicking the button of the input device 16 again while the cursor 43 is in the insertion specifiable area. Moreover, different from the case of specifying the insertion location from the actual position of the cursor 43, it can also be constituted in such a way as to specify the insertion location by releasing the button of the input device 16 while the specific edge (the left edge in this example) of the insertion paper illustration 67 moved around by the cursor 43 is located within the insertion specifiable area. Moreover, although the page number is to be displayed on the printing paper illustrations 41a and 41b, it is also possible to display the thumbnail in lieu of the page number or together with the page number on the printing paper illustrations 41a and 41b. In this case, the thumbnail here means a miniature image produced by reducing the image that corresponds to the print data of the particular page. Since the conversion method itself from the print data to the thumbnail is identical to the prior art, so that detailed descriptions are omitted.

Although the constitution of the first embodiment of the present invention is described as above, the invention is not limited to the above description, and various modifications are possible. Although a PC is used as the print data transmission device of the invention in the abovementioned embodiment, the invention is not limited to it and other printing job transmission devices such as a portable terminal can be used for the same purpose.

Second Embodiment

Although the first embodiment was described as above that the printer driver, which is the control program, is executed by the PC1 in order to process the job, the invention is not limited to it. This invention can be applied for designating locations where selected functions are applied using touch panels in image forming apparatuses of copying machines, compound machines, and MFPs (Multi-Function Peripherals).

The application to the image forming apparatus will be described below as the second embodiment of the present invention. An MFP will be used in the following description as a typical image forming apparatus.

Figure 25:
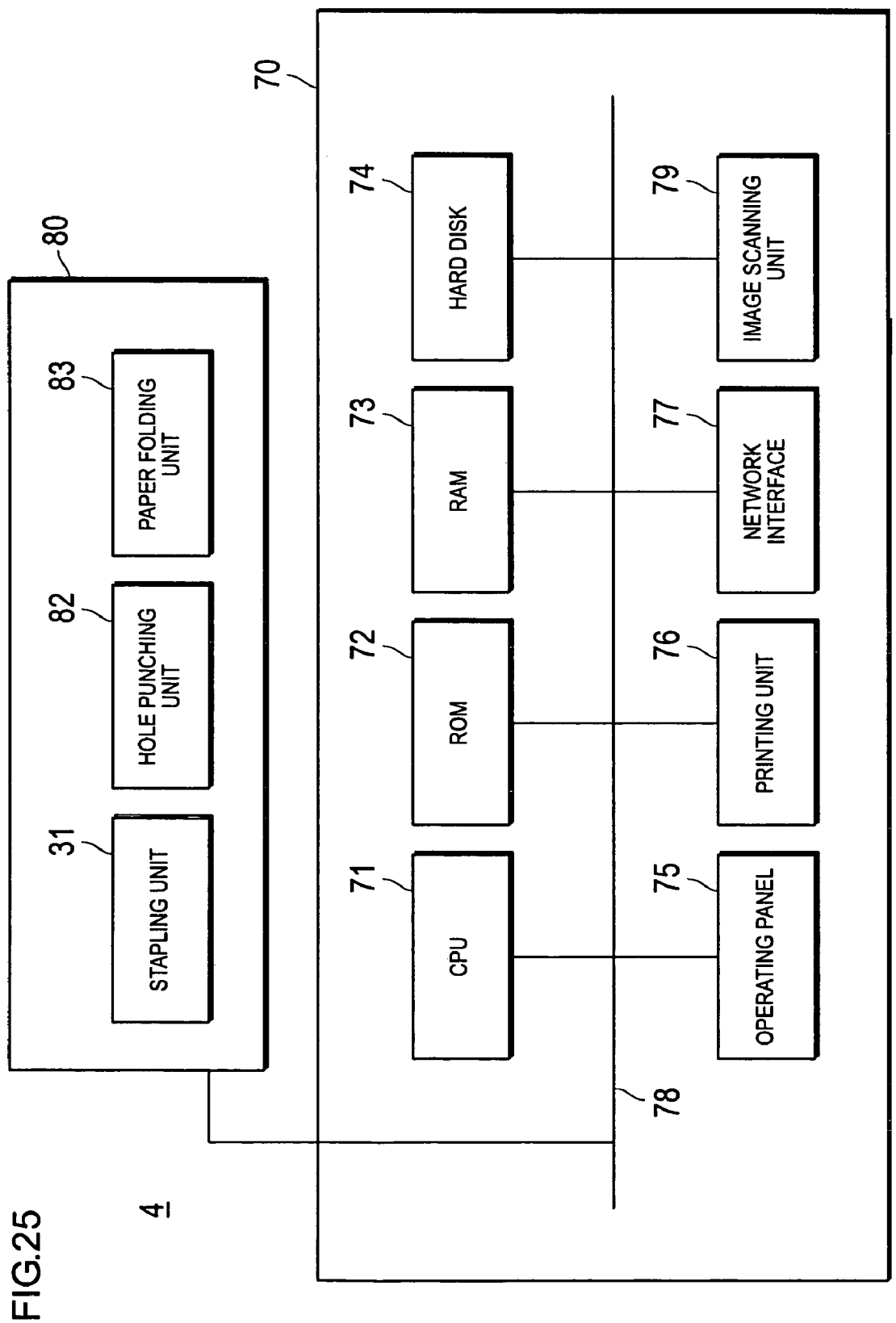
FIG. 25 is a block diagram showing the constitution of a multi-function peripheral used in a second embodiment of the invention.

FIG. 25 shows the constitution of an MFP 4 as the embodiment of the invention. The MFP 4 includes an MFP main body 70 and a post-processing device (finisher) 80.

The MFP main body 70 has a CPU 71, a ROM 72, a RAM 73, a hard disk 74, an operating panel unit 75, a printing unit 76, and a network interface 77. These parts are interconnected for exchanging signals via a bus 78. The functions of each of these units are identical to those of the printer 2 shown in FIG. 3. Therefore, the detailed descriptions are not repeated here. The MFP main body 70 has an image scanner 79 as well. The image obtained by scanning the document by the image scanner 79 is printed on the paper by the printing unit 76.

The post-processing apparatus 80 includes a staple processing unit 81, a punch hole unit 82 and a paper folding unit 83. The functions of each of these units are identical to those of the printer 2 shown in FIG. 3. Therefore, the detailed descriptions are not repeated here.

Next, the operation of the MFP 4, the image forming apparatus of the embodiment, is described below.

Figure 26:
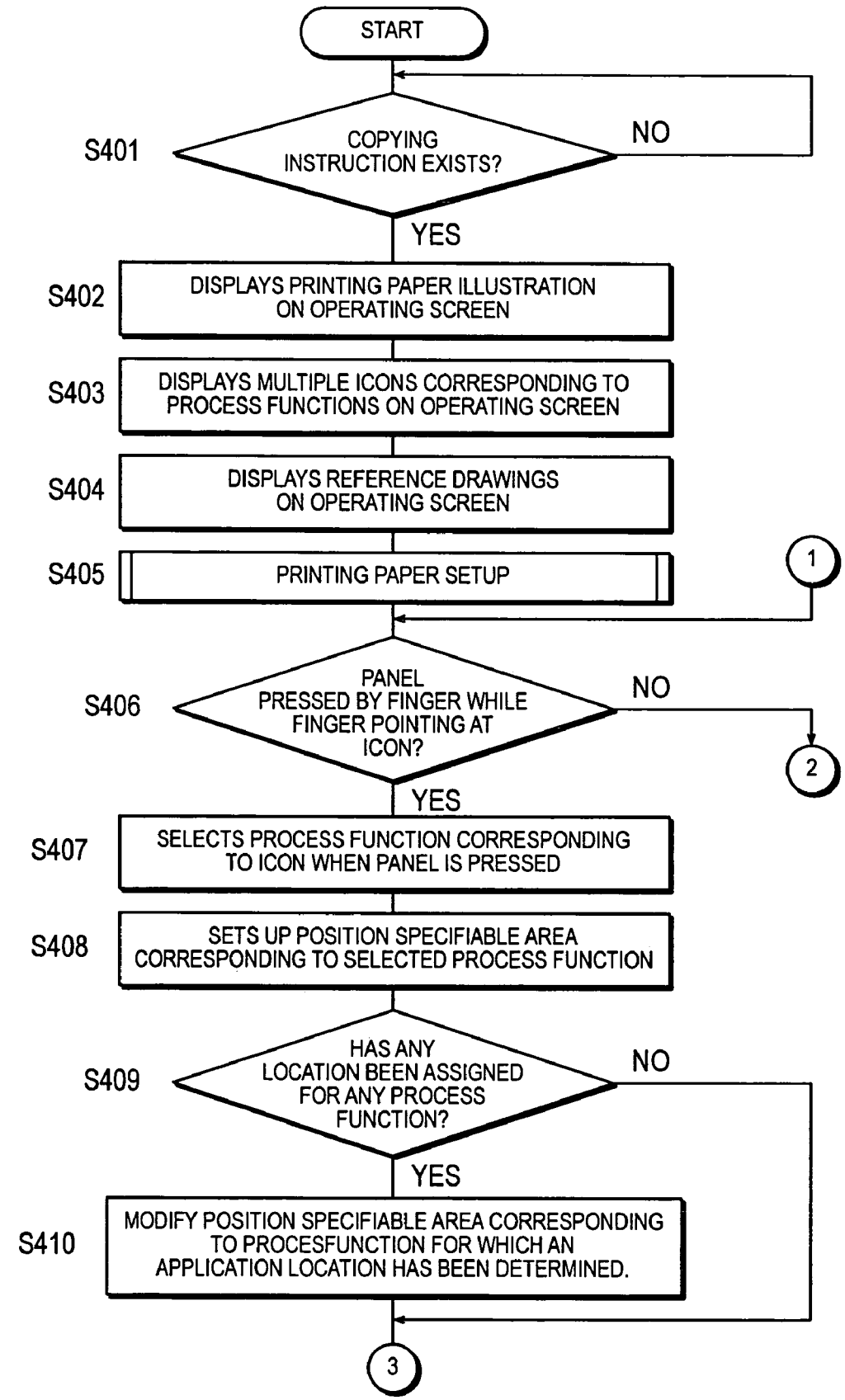
FIG. 26 is a flow chart showing the process sequence for setting up the process functions of the multi-function peripheral.
Figure 27:
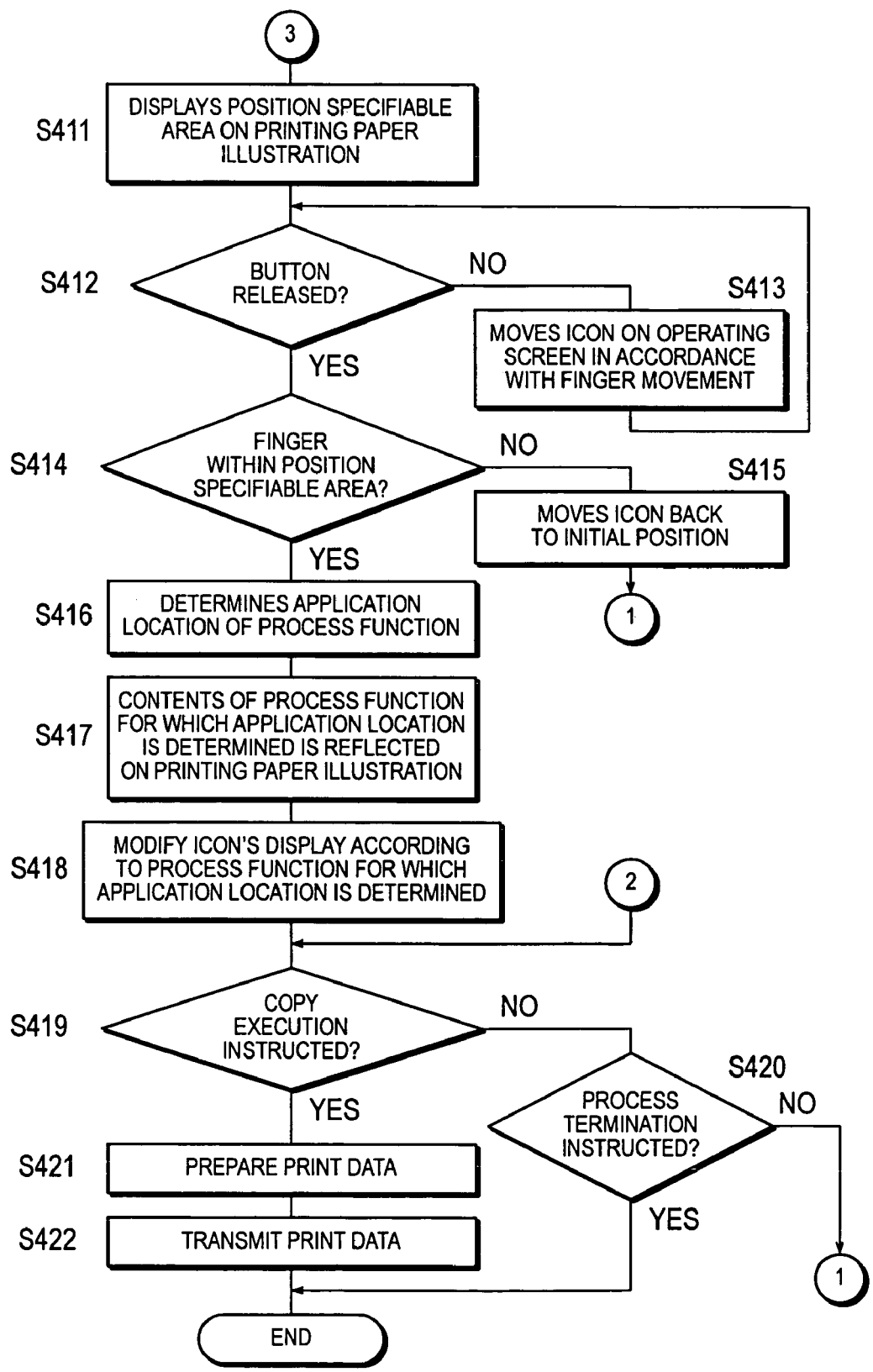
FIG. 27 is a flowchart that follows FIG. 26.

FIG. 26 and FIG. 27 represent flowcharts showing the printing process procedure on the MFP 4. The algorithm shown in the flowcharts is stored as a control program in a memory unit such as a hard disk 74 of MFP 4 and executed by CPU 71.

The processing procedure shown in the flowchart shown in FIG. 26 and FIG. 27 is executed by the MFP 4, the image forming apparatus. The MFP 4 executes copying jobs instead of transmitting print data in the step S422. Further, copying instructions and copying execution instructions are made in lieu of printing instructions and printing execution instructions are made in the step S401 and step S419. Furthermore, in the step S402 and the S403, the printing paper illustration 41 and the icon 42 are displayed on the operating screen of the operating panel unit 75, which is built as a touch panel. Also, in the steps S406, S412, and S413, the user's finger operation is used in lieu of the operations of the cursor and the button of the input device 16. Other than the above, the process sequence according to the flowchart shown in FIG. 26 and FIG. 27 is identical to the process sequence shown in FIG. 4 and FIG. 5.

As shown in the above, the MFP 4, i.e., the image forming apparatus of the present embodiment, has a display of displaying on the operating screen a printing paper illustration 41 and a plurality of icons 42 related to the process functions of the MFP 4; a selector of selecting the process function corresponding to the specified icon 42; and a specifier of determining the location to which the selected process function is applied on the printing paper by receiving the instruction for the position on the printing paper illustration.

Figure 28:
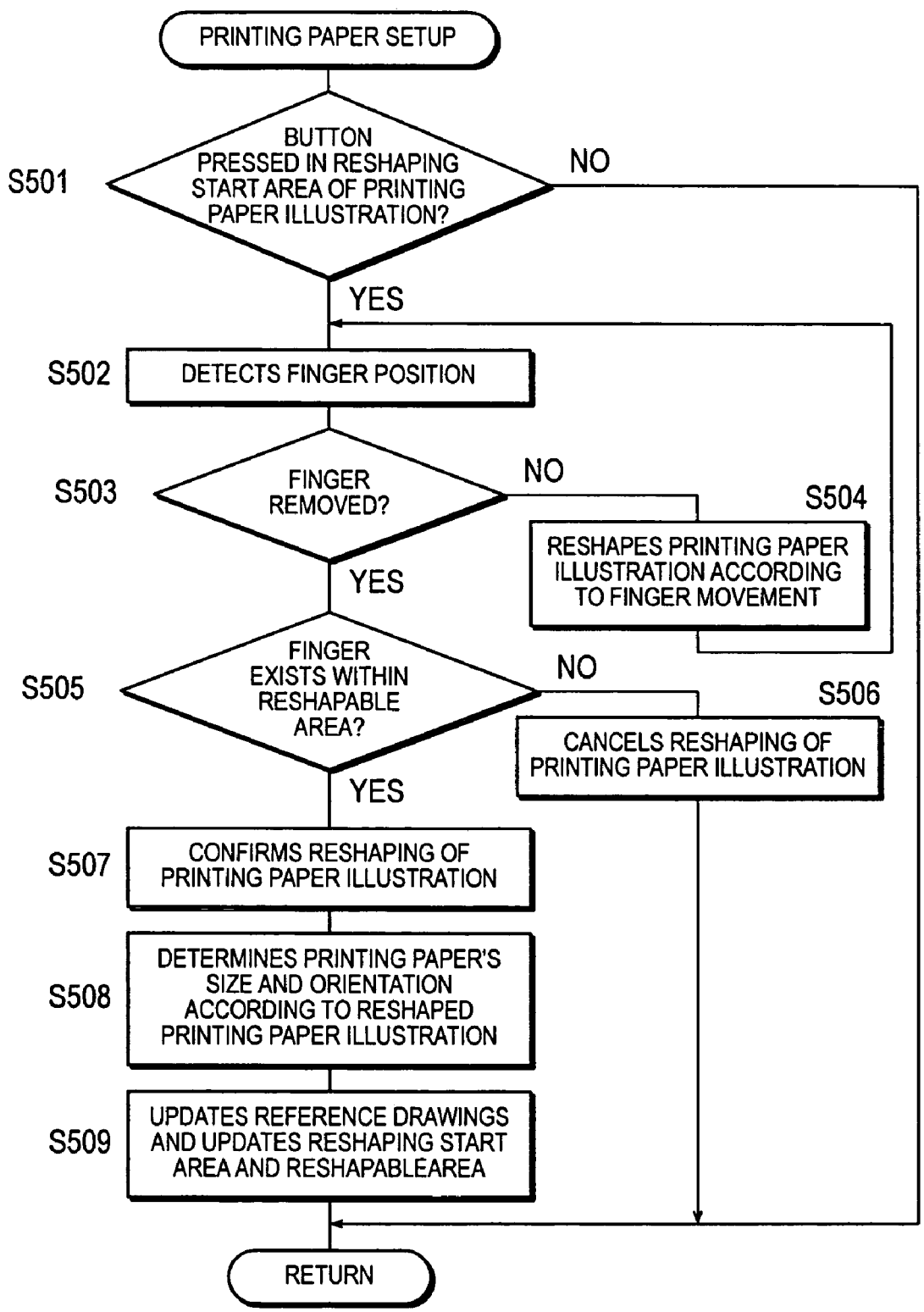
FIG. 28 is a flowchart for describing the paper setup process shown in the step S405 of FIG. 26.

FIG. 28 is a flowchart showing the procedure of the printing paper setup process by the MFP 4, and corresponds to a subroutine showing the contents of the step S405 of FIG. 26.

The processing procedure shown in the flowchart shown in FIG. 28 is executed by the MFP 4, the image forming apparatus. Also, in the steps S501 through S505, the user's finger operation is used in lieu of the operations of the cursor and the button of the input device 16. Other than the above, the process sequence according to the flowchart shown in FIG. 28 is identical to the process sequence shown in FIG. 15.

As shown above, the MFP 4, i.e., the image forming apparatus of the present embodiment, has a display of displaying the printing paper illustration 41 on the operating screen; a reshaper of reshaping the printing paper illustration 41 upon receiving the instruction for the reshaping location on the operating screen; and a specifier of determining the size and/or orientation of the printing paper in accordance with the reshaped printing paper illustration.

Figure 29:
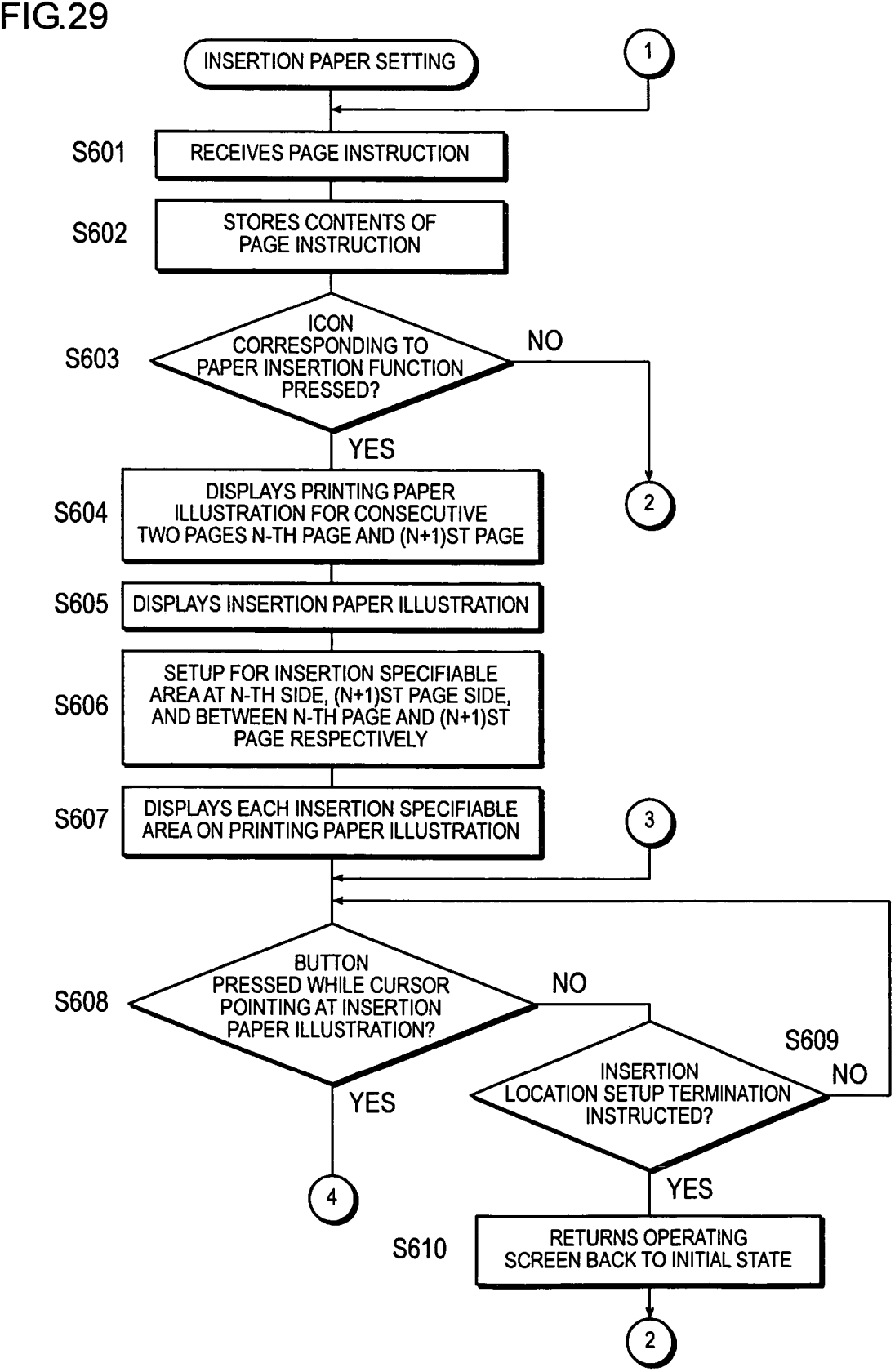
FIG. 29 is a flow chart showing a process sequence by the multi-function peripheral for setting up the paper insertion location.
Figure 30:
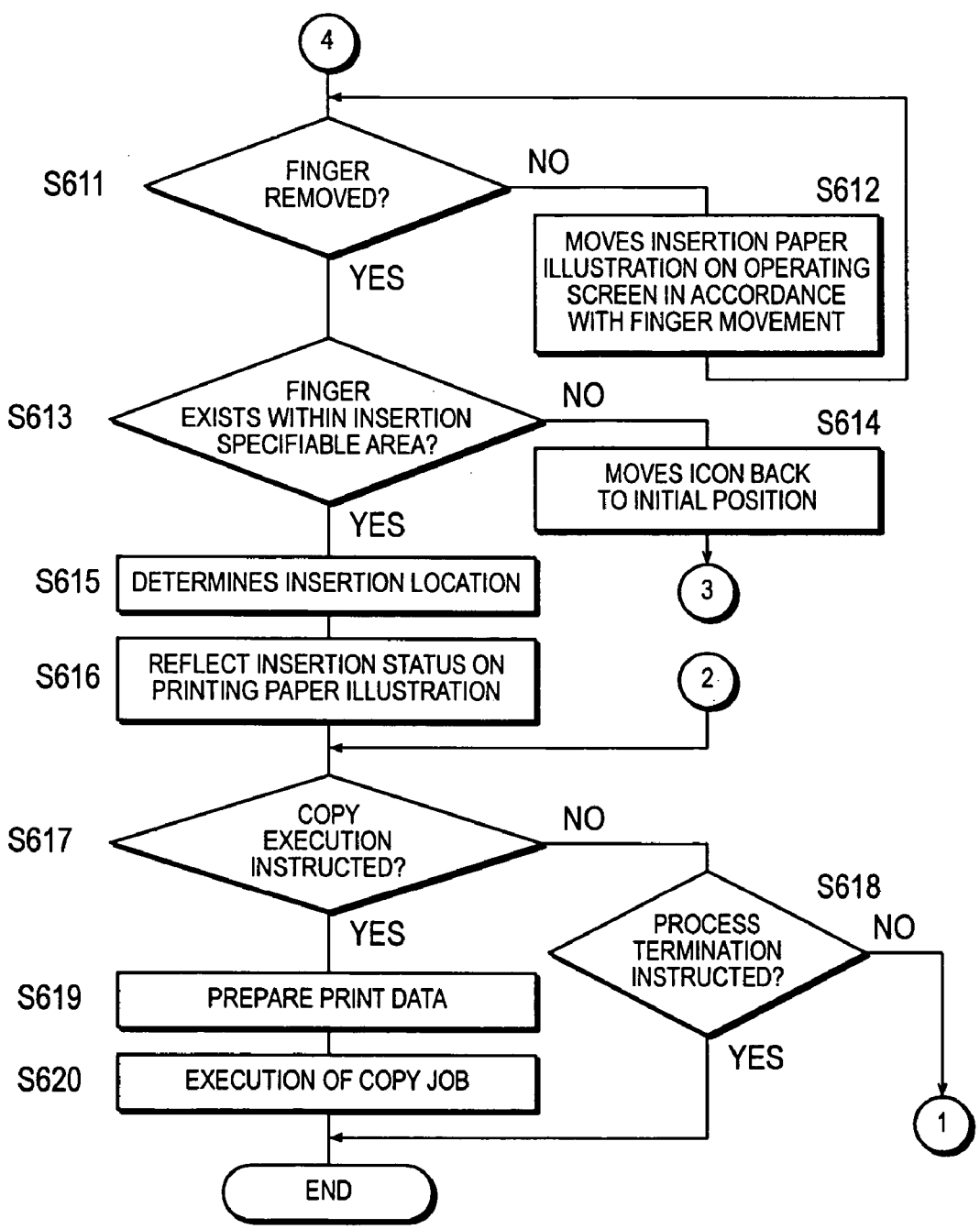
FIG. 30 is a flowchart that follows FIG. 29.

FIG. 29 and FIG. 30 represent flowcharts showing the inserting location setup process procedure for the insertion paper by the MFP 4. The algorithm shown in the flowcharts is stored as a control program in a memory unit such as a hard disk 74 of MFP 4 and executed by CPU 71.

The processing procedure shown in the flowchart shown in FIG. 29 and FIG. 30 is executed by the MFP 4, the image forming apparatus. The MFP 4 executes copying jobs instead of transmitting print data in the step S620. Also, a copying execution instruction is made in lieu of a printing execution instruction in the step S617. Furthermore, in the step S604 and the S605, the printing paper illustrations 41a and 41b for consecutive multiple pages as well as the insertion paper illustration 67 are displayed on the operating screen of the operating panel unit 75, which is built as a touch panel. Also, in the steps S603, S608, and S611 through S613, the user's finger operation is used in lieu of the operations of the cursor and the button of the input device 16. Other than the above, the process sequence according to the flowchart shown in FIG. 29 and FIG. 30 is identical to the process sequence shown in FIG. 21 and FIG. 22.

As can be seen from the above, the MFP 4, which is the image forming apparatus of the present embodiment, has a display of displaying the printing paper illustrations 41a and 41b representing a consecutive pages of printing paper as well as the insertion paper illustration 67 on the operating screen; and a specifier of determining the insertion location of insertion paper by receiving the instruction for the position on the printing paper illustrations 41a and 41b.

These elements are realized by the CPU 71 as it executes the control program stored in the storage unit such as the hard disk 74 of the MFP 4.

Although the constitution of MFP as the present embodiment is as described in the above, the invention is not limited to the above description, and various modifications are possible.

For example, it is described in the above that the icon 42 is specified by pressing it which the finger is pointing at the icon 42, and the position is instructed on the printing paper illustration 41 by moving the finger while pressing and releasing the finger from the operating panel unit 75 while the finger is located within the position specifiable areas 44a through 44c. However, it is possible to specify one of the icons 42 and a position on the printing paper illustration by other methods. For example, it can also be constituted in such a way that pressing the icon 42 with the finger while the finger is pointing at it and releasing it specifies the icon 42, whereas pressing and releasing while the finger is pointing at the specifable area specifies a position in the printing paper illustration 41. In other words, it can be applied to any type of image forming device as long as the printing paper illustration 41 is displayed on the operating screen, at least one icon 42, each of which is related to a process function of the image forming apparatus, is also displayed on the operating screen, the process function corresponding to the specified icon is selected upon receiving an instruction for the icon 42, and the location at which the selected process function is applied is determined relative to the printing paper. Further, the finger operation can be replaced with an operation using a stylus pen.

Furthermore, although an MFP is mentioned as the image forming apparatus in the above embodiment, other image forming apparatus such as copying machines and complex machines can be used as well as the image forming apparatus of this invention.

Although the above descriptions cover some preferable embodiments of the present invention, other variations are also possible.

The elements and steps of conducting various processes in the image processing system according to the present invention can be realized by means of a dedicated hardware circuit, or a programmed computer. The program can be provided either by a computer readable recording medium such as a flexible disk and a CD-ROM, or by being supplied on-line via a network such as the Internet. In this case, the program recorded on the computer readable recording medium is normally transferred to and stored in a memory unit such as a hard disk. The program can also be provided as independent application software or can be built into the software of the image processing device as a part of its function.

What is claimed is:

1. A controlling method for controlling image forming apparatus, comprising the steps of:
    displaying a printing paper illustration representing printing paper on an operating screen;
    displaying at least one icon related to a process function of the image forming apparatus;
    selecting a process function corresponding to an icon specified out of the displayed icon;
    determining a location to which the selected process function is applied upon receiving an instruction for a position on the printing paper illustration; and
    setting up at least one area where the position can be instructed on the printing paper illustration, in accordance with the selected process function.

2. A controlling method of claim 1, wherein the step of displaying the icon includes a step of displaying a plurality of icons on the operating screen,
    wherein the plurality of icons is related to a plurality of process functions.

3. A controlling method of claim 1, wherein the step of setting up the area includes a step of modifying at least one area where the position can be instructed for a newly selected process function, in accordance with the contents of a prior process function for which the application location has been determined and the application location thereof.

4. A controlling method of claim 1, further comprising a step of displaying the area where the position can be instructed on the printing paper illustration.

5. A controlling method of claim 1, further comprising a step of preparing print data including information of the location to which the selected process function is applied.

6. A controlling method of claim 1, wherein the process function is at least either one of stapling, punching, folding, watermarking, and paper insertion.

7. A controlling method of claim 1, wherein the position on the printing paper illustration is instructed by dragging the specified icon and dropping the specified icon within at least one area where the position can be instructed.

8. A controlling method for controlling image forming apparatus, comprising the steps of:
    displaying a printing paper illustration representing printing paper on an operating screen;
    displaying at least one icon related to a process function of the image forming apparatus;
    selecting a process function corresponding to an icon specified out of the displayed icon; and
    determining a location to which the selected process function is applied upon receiving an instruction for a position on the printing paper illustration;
    wherein the step of displaying the icon includes a step of modifying the display of the icon which has become impossible to be specified in accordance with the contents of a prior process function for which the application location has been determined.

9. A controlling method for controlling image forming apparatus, comprising the steps of:
    displaying a printing paper illustration representing printing paper on an operating screen;
    displaying at least one icon related to a process function of the image forming apparatus;
    selecting a process function corresponding to an icon specified out of the displayed icon;
    determining a location to which the selected process function is applied upon receiving an instruction for a position on the printing paper illustration; and
    modifying the display of the printing paper illustration, in accordance with the contents of a prior process function for which the application location has been determined and the application location thereof.

10. A controlling method for controlling image forming apparatus, comprising the steps of:
    displaying a printing paper illustration representing consecutive pages of printing paper on an operating screen;
    determining an insertion location of insertion paper by receiving an instruction for a position on the printing paper and;
    receiving an instruction for specifying a reference page for inserting the insertion paper;
    wherein the step of displaying the printing paper illustration on the operating screen includes a step of displaying a printing paper illustration representing a plurality of pages that include the reference page.

11. A controlling method controlling image forming apparatus, comprising the steps of:
    displaying a printing paper illustration representing a consecutive pages of printing paper on an operating screen;
    determining an insertion location of insertion paper by receiving an instruction for a position on the printing paper illustration; and
    displaying an insertion paper illustration representing the insertion paper,
    wherein the position on the printing paper illustration is instructed by dragging the insertion paper illustration and dropping the insertion paper illustration within at least one area where the position can be instructed.

12. A controlling method for controlling image forming apparatus, comprising the steps of:
    displaying a printing paper illustration representing a consecutive pages of printing paper on an operating screen;
    determining an insertion location of insertion paper by receiving an instruction for a position on the printing paper illustration;
    wherein the printing paper illustration shows a positional relation between the multiple pages of printing paper and the insertion paper on the operating screen in accordance with the determined insertion location.

13. A controlling method for controlling image forming apparatus, comprising the steps of:
    displaying a printing paper illustration representing printing paper on an operating screen;
    reshaping the printing paper illustration upon receiving an instruction for a reshaping position on the operating screen; and
    determining the printing paper's size and/or orientation in accordance with the reshaped printing paper illustration.

14. A controlling method claim 13, further comprising a step of setting up at least one area where the reshaping position can be instructed.

15. A controlling method claim 14, further comprising a step of displaying a plurality of reference drawings corresponding to a plurality of printing paper sizes and/or orientations on the operating screen, wherein the area where the reshaping position can be instructed is set up in accordance with each reference drawing.

16. A controlling method claim 13, wherein the reshaping position on the printing paper illustration is instructed by dragging the printing paper illustration's outer edge and dropping.

17. A controlling method claim 16, further comprising a step of setting up at least one area where the reshaping position can be instructed, wherein the instruction for a reshaping position is cancelled if the outer edge is dropped outside the area where the reshaping position can be instructed.

* * * * *